(12) United States Patent
Kim et al.

(10) Patent No.: US 8,509,267 B2
(45) Date of Patent: Aug. 13, 2013

(54) SYNCHRONIZATION TRANSMISSIONS IN A WIRELESS COMMUNICATION SYSTEM

(75) Inventors: Byoung-Hoon Kim, Seoul (KR); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 12/439,711

(22) PCT Filed: Oct. 1, 2007

(86) PCT No.: PCT/US2007/080111
§ 371 (c)(1),
(2), (4) Date: Jun. 5, 2009

(87) PCT Pub. No.: WO2008/042865
PCT Pub. Date: Apr. 10, 2008

(65) Prior Publication Data
US 2011/0002430 A1    Jan. 6, 2011

Related U.S. Application Data

(60) Provisional application No. 60/828,051, filed on Oct. 3, 2006.

(51) Int. Cl.
*H04J 3/06* (2006.01)
(52) U.S. Cl.
USPC .......................................... 370/503; 370/350
(58) Field of Classification Search
USPC ................ 370/335, 342, 503, 509, 333, 441, 370/513, 572, 320, 515, 512, 350; 455/562.1, 455/436; 375/354, 362, 364
See application file for complete search history.

(56) References Cited

U.S. PATENT DOCUMENTS

| | | | |
|---|---|---|---|
| 5,418,571 | A | 5/1995 | Ghanbari |
| 6,728,540 | B1 | 4/2004 | DeSantis et al. |

(Continued)

FOREIGN PATENT DOCUMENTS

| | | |
|---|---|---|
| CN | 1274250 A | 11/2000 |
| EP | 1463216 A2 | 9/2004 |

(Continued)

OTHER PUBLICATIONS

El Gamal, H. et al.: "Universal Space-Time Coding," IEEE Transactions on Information Theory, vol. 49, Issue 5, pp. 1097-1119, XP011074756, ISSN: 0018-9448, May 2003.

(Continued)

*Primary Examiner* — Dady Chery
(74) *Attorney, Agent, or Firm* — Paul Kuo

(57) ABSTRACT

To support cell search, multiple (e.g., two) synchronization transmissions are sent in a frame with non-uniform spacing. Information is conveyed via the non-equal distances between consecutive synchronization transmissions. Multiple levels of non-uniform spacing may be used to convey different types of information. In one design, the multiple synchronization transmissions are sent in different subframes of a frame, and each synchronization transmission is sent in one of multiple symbol periods in a respective subframe. The synchronization transmissions may be sent in non-evenly spaced subframes to convey frame boundary. One synchronization transmission may be sent in one of multiple possible symbol periods depending on the information, e.g., a particular group of cell IDs, being conveyed. The distances between synchronization transmissions may also be used to convey cyclic prefix length. A secondary synchronization transmission carrying a cell ID may be sent at a predetermined offset from one of the multiple synchronization transmissions.

49 Claims, 11 Drawing Sheets

(56) References Cited

U.S. PATENT DOCUMENTS

| | | | |
|---|---|---|---|
| 6,729,540 | B2 | 5/2004 | Ogawa |
| 6,741,578 | B1 * | 5/2004 | Moon et al. .................. 370/335 |
| 6,834,046 | B1 * | 12/2004 | Hosur et al. .................. 370/335 |
| 6,968,194 | B2 | 11/2005 | Aljadeff et al. |
| 6,985,498 | B2 | 1/2006 | Laroia et al. |
| 7,092,353 | B2 | 8/2006 | Laroia et al. |
| 7,508,842 | B2 | 3/2009 | Baum et al. |
| 2004/0228269 | A1 | 11/2004 | Balakrishnan et al. |
| 2005/0030967 | A1 | 2/2005 | Ohmi et al. |
| 2005/0032534 | A1 | 2/2005 | Yoshizawa et al. |
| 2005/0153695 | A1 | 7/2005 | Cho |
| 2005/0250469 | A1 | 11/2005 | Laroia et al. |
| 2006/0057994 | A1 | 3/2006 | Anand |
| 2006/0155533 | A1 | 7/2006 | Lin et al. |
| 2006/0161432 | A1 | 7/2006 | Zhang et al. |
| 2007/0002811 | A1 | 1/2007 | Faccin et al. |
| 2007/0263743 | A1 | 11/2007 | Lee et al. |
| 2008/0095108 | A1 | 4/2008 | Malladi et al. |

FOREIGN PATENT DOCUMENTS

| | | |
|---|---|---|
| JP | 2005525725 | 8/2005 |
| JP | 2007529157 T | 10/2007 |
| JP | 2008515360 T | 5/2008 |
| KR | 1020000077117 | 12/2000 |
| RU | 2120702 C1 | 10/1998 |
| RU | 2280329 C1 | 7/2006 |
| WO | 0067399 | 11/2000 |
| WO | 0211331 | 2/2002 |
| WO | 2005038606 | 4/2005 |
| WO | 2005039094 | 4/2005 |
| WO | WO2006018710 A1 | 2/2006 |
| WO | 2006044661 | 4/2006 |

OTHER PUBLICATIONS

Samanta, et al.: "Codebook Adaptation for Quantized MIMO Beamforming Systems," Conference Record of the Thirty-Ninth Asilomar Conference on Signals, Systems and Computers, 2005, pp. 376-380, XP010900022, ISBN: 978-1-4244-0131-4, Oct. 28-Nov. 1, 2005.

Translation of Office Action in Russian application 2009-113820 corresponding to U.S. Appl. No. 11/853,704, citing WO2005038606 ,RU2120702 ,WO2005039094 and WO2006044661 dated Feb. 7, 2011.

3GPP TR 25.814 v7.1.0; "3rd Generation Partnership Project; Technical Specification Group Radio Access Network; Physical layer aspects for evolved Universal Terrestrial Radio Access (UTRA)," 3GPP TR 25.814 version 7.1.0, Release 7, Sep. 2006.

3GPP TS 36.211 v0.1.0; "3rd Generation Partnership Project; Technical Specification Group Radio Access Network; Physical Channels and Modulation," 3GPP TS 36.211 version 0.1.0, Release 8, Oct. 2006.

3GPP TS 36.212 v0.1.0; "3rd Generation Partnership Project; Technical Specification Group Radio Access Network; Multiplexing and channel coding," 3GPP TS 36.212 version 0.1.0, Release 8, Oct. 2006.

3GPP TS 36.213 v0.1.0; "3rd Generation Partnership Project; Technical Specification Group Radio Access Network; Physical layer procedures," 3GPP TS 36.213 version 0.1.0, Release 8, Oct. 2006.

3GPP TSG-RAN WG1 #46: "SCH Structure for E-UTRA", vol. R1-062037, Aug. 28, 2006, pp. 1-5, XP002476390, Tallinn, Estonia.

3GPP TSG-RAN WG1 Meeting #46: "Multiplexing Method of SCH for E-UTRA Downlink", Aug. 28-Sep. 2006, pp. 1-9, XP002476889, Tallinn, Estonia.

3GPP TSG RAN WG1 Meeting #43; "Cell Search procedure for initial synchronization and neighbour cell identification," 3GPP R1-051549, Seoul, Korea, Nov. 7-11, 2005.

3GPP TSG RAN WG1 #46; "Hierarchical SCH design," 3GPP R1-062289, Tallinn, Estonia, Aug. 28-Sep. 1, 2006.

3GPP TSG RAN1 #46-bis; "Neighbor Cell Search-Structure and Simulations," 3GPP R1-062692, Seoul, Korea, Oct. 9-13, 2006.

Partial International Search Report—PCT/US2007/080111, International Search Authority—European Patent Office—Apr. 29, 2008.

International Search Report—PCT/US2007/080111, International Search Authority—European Patent Office—Aug. 4, 2008.

Written Opinion—PCT/US2007/080111, International Search Authority—European Patent Office—Aug. 4, 2008.

European Search Report—EP12170548—Search Authority—Munich—Sep. 10, 2012.

Taiwan Search Report—TW096137092—TIPO—Mar. 22, 2012.

* cited by examiner

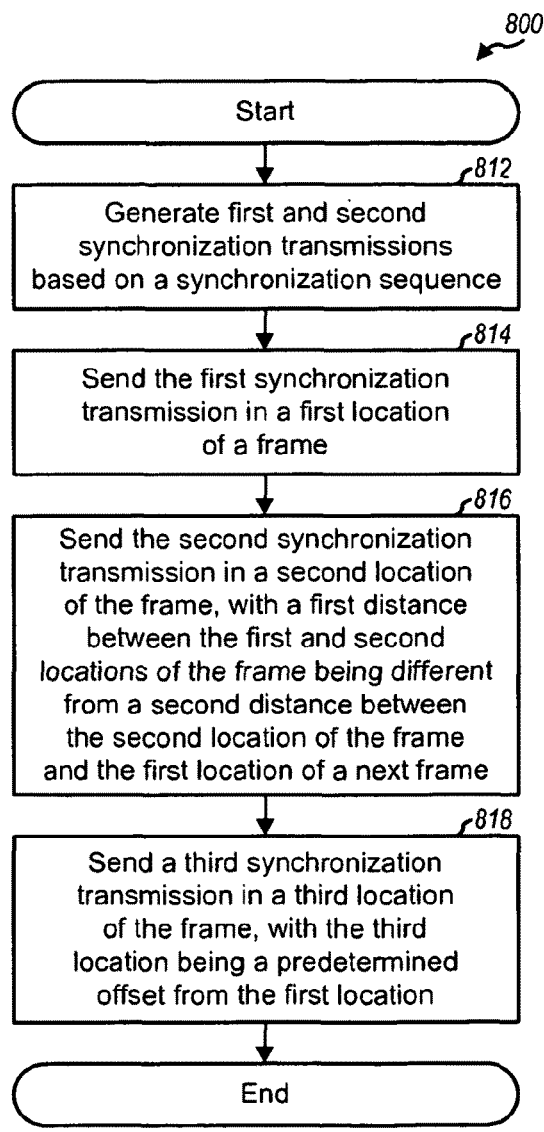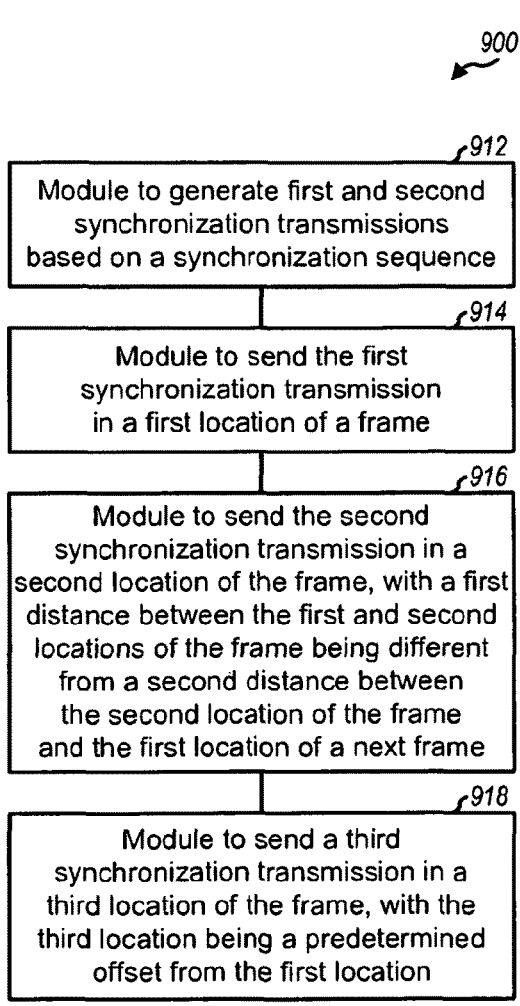
FIG. 8
FIG. 9

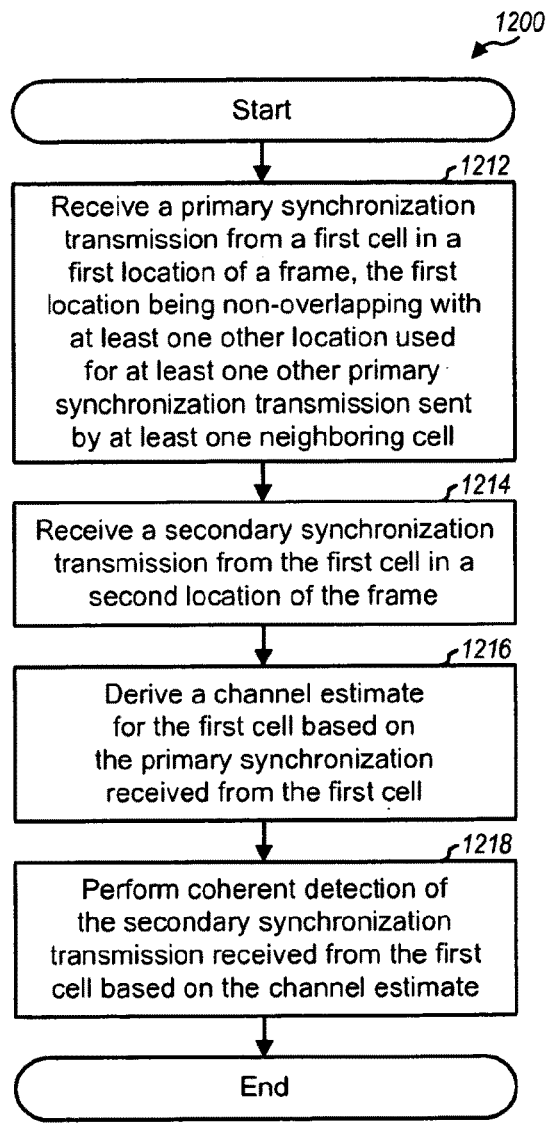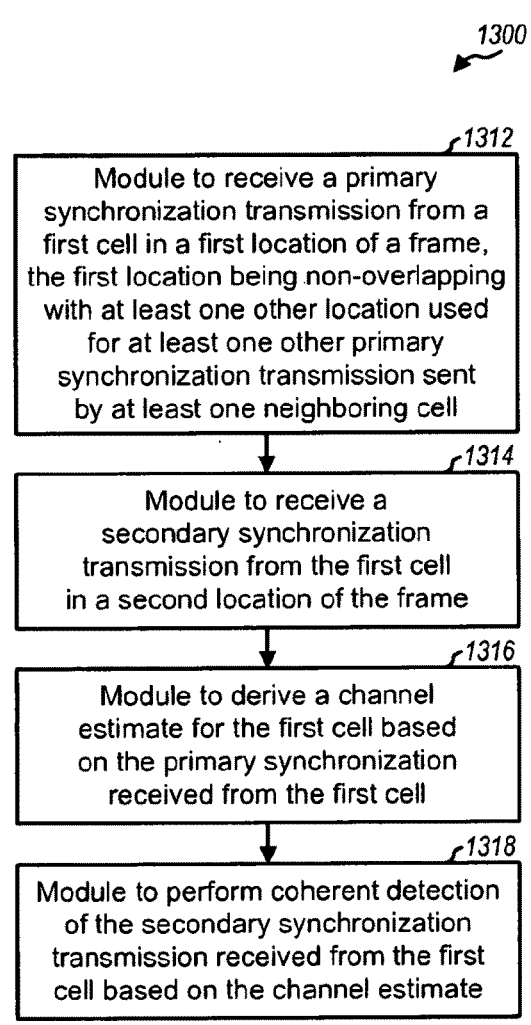
FIG. 12
FIG. 13

SYNCHRONIZATION TRANSMISSIONS IN A WIRELESS COMMUNICATION SYSTEM

The present application claims priority to provisional U.S. Application Ser. No. 60/828,051, entitled "A METHOD AND APPARATUS FOR P-SCH FOR E-UTRA," filed Oct. 3, 2006, assigned to the assignee hereof and incorporated herein by reference.

BACKGROUND

I. Field

The present disclosure relates generally to communication, and more specifically to techniques for supporting cell search in a wireless communication system.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations (or Node Bs) that support communication for many user equipments (UEs). A UE (e.g., a cellular phone) may be within the coverage of zero, one, or multiple base stations at any given moment. The UE may have just been powered on or may have lost coverage and thus may not know which base stations can be received. The UE may perform cell search to detect for base stations and to acquire timing and other information for the detected base stations.

Each base station may send synchronization transmissions to assist the UEs perform cell search. In general, a synchronization transmission may be any transmission that allows a receiver to detect a transmitter and obtain information such as timing, etc. The synchronization transmissions represent overhead and should be sent as efficiently as possible. Furthermore, the synchronization transmissions should allow the UEs to perform cell search as quickly and robustly as possible.

SUMMARY

Techniques for supporting cell search by efficiently conveying information via synchronization transmissions are described herein. In an aspect, multiple (e.g., two) synchronization transmissions are sent in a frame with non-uniform spacing between the synchronization transmissions. Information is conveyed via the non-equal distances or time intervals between consecutive synchronization transmissions. The synchronization transmissions may correspond to primary synchronization codes (PSCs) sent on a primary synchronization channel (P-SCH) or some other transmissions sent on some other channel.

In another aspect, multiple levels of non-uniform spacing of the synchronization transmissions may be used to convey different types of information. In one design, the multiple synchronization transmissions are sent in different subframes of a frame, and each synchronization transmission is sent in one of multiple symbol periods in a respective subframe. Two levels of non-uniform spacing may be achieved with this transmission structure. Subframe-level non-uniform spacing may be achieved by sending the synchronization transmissions in non-evenly spaced subframes and may be used to convey frame boundary. Symbol-level non-uniform spacing may be achieved by sending one synchronization transmission in one of multiple possible symbol periods depending on the information being conveyed via the symbol-level non-uniform spacing. For example, multiple groups of cell identifiers (IDs) may be associated with different symbol periods, and each cell may be assigned a cell ID from one of the groups. A cell may the send a synchronization transmission in a symbol period for the group of cell IDs to which the cell belongs. The distances between consecutive synchronization transmissions may also be used to convey a cyclic prefix length used by a cell.

A secondary synchronization transmission may be sent in a location that is a predetermined offset from (e.g., next to) one of the multiple synchronization transmissions. The secondary synchronization transmission may correspond to a secondary synchronization code (SSC) sent on a secondary synchronization channel (S-SCH) or some other transmission sent on some other channel. A channel estimate may be derived based on the adjacent or nearby synchronization transmission and used for coherent detection of the secondary synchronization transmission, which may improve performance.

Various aspects and features of the disclosure are described in further detail below.

BRIEF DESCRIPTION OF THE DRAWINGS

FIG. 8 shows a process performed by a Node B to support cell search.

FIG. 9 shows an apparatus for supporting cell search.

FIG. 12 shows another process performed by the UE for cell search.

FIG. 13 shows another apparatus for performing cell search.

DETAILED DESCRIPTION

Figure 1:
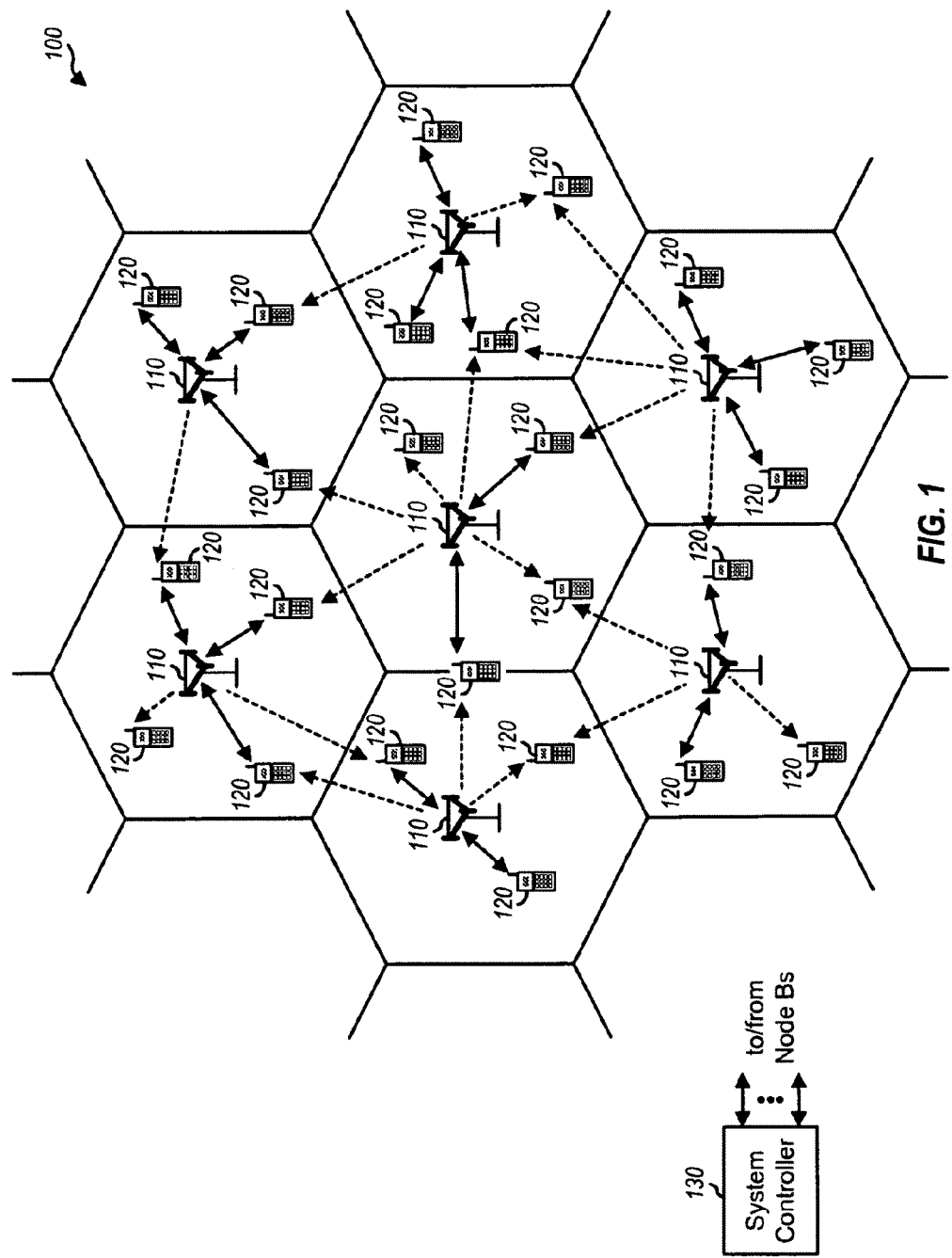
FIG. 1 shows a wireless communication system.

FIG. 1 shows a wireless communication system 100 with multiple Node Bs 110. A Node B is generally a fixed station that communicates with the UEs and may also be referred to as a base station, an enhanced Node B (eNode B), an access point, etc. Each Node B 110 provides communication coverage for a particular geographic area. The term "cell" can refer to a Node B and/or its coverage area depending on the context in which the term is used. To improve system capacity, a Node B coverage area may be partitioned into multiple smaller areas (e.g., three smaller areas), and each smaller area may be served by a respective base transceiver station (BTS). The term "sector" can refer to a BTS and/or its coverage area depending on the context in which the term is used. For a sectorized cell, the BTSs for all sectors of that cell are typically co-located within the Node B for the cell. The techniques described herein may be used for systems with sectorized cells as well as systems without sectorized cells. For simplicity, in the following description and claims, the term "cell" can generically refer to a Node B and/or its coverage area in a system with un-sectorized cells and to a BTS and/or its coverage area in a system with sectorized cells.

UEs 120 may be dispersed throughout the system. A UE may be stationary or mobile and may also be referred to as a mobile station, a mobile equipment, a terminal, an access terminal, a station, etc. A UE may be a cellular phone, a personal digital assistant (PDA), a wireless modem, a wireless communication device, a handheld device, a laptop computer, a subscriber unit, a cordless phone, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates communication between a Node B and a UE. A broken line with a single arrow indicates a UE receiving a downlink signal from a Node B. A UE may perform cell search based on the downlink signals from the Node Bs in the system.

A system controller 130 may couple to Node Bs 110 and provide coordination and control for these Node Bs. System controller 130 may be a single network entity or a collection of network entities. System controller 130 may comprise a Radio Network Controller (RNC), a Mobile Switching Center (MSC), etc.

The techniques described herein may be used for various communication systems such as CDMA, FDMA, TDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system utilizes Orthogonal Frequency Division Multiplexing (OFDM) and sends modulation symbols in the frequency domain on orthogonal subcarriers, which may also be referred to as tones, bins, etc. An OFDMA system may implement a radio technology such as Long Term Evolution (LTE), Flash-OFDM®, etc. An SC-FDMA system utilizes Single-Carrier Frequency Division Multiplexing (SC-FDM) and sends modulation symbols in the time domain on orthogonal subcarriers. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for E-UTRA and LTE, and 3GPP terminology is used in much of the description below.

In system 100, Node Bs 110 may periodically send synchronization transmissions to allow UEs 120 to detect the Node Bs and obtain information such as timing, cell ID, etc. The synchronization transmissions may be sent in various manners. In one design that is described in detail below, each Node B periodically transmits a P-SCH and an S-SCH. The P-SCH may carry one or more PSCs in each radio frame of a predetermined time duration. The S-SCH may carry one or more SSCs in each radio frame.

A UE may search for Node Bs or cells with a two-stage detection process. In the first stage or PSC detection stage, the UE may detect for cells based on the PSCs sent on the P-SCH and obtain timing for each detected cell. The UE may also derive a channel estimate for each detected cell based on a PSC received from that cell. In the second stage or SSC detection stage, the UE may identify each detected cell based on the SSC sent on the S-SCH. To improve SSC detection performance, the UE may perform coherent detection of the SSC for each detected cell with the channel estimate obtained from the PSC for that cell.

In general, one or multiple PSCs may be sent in each radio frame. Multiple PSCs may improve search time and reduce search complexity by (a) reducing the number of timing/sample hypotheses to test between consecutive PSCs and (b) increasing signal energy through combining PSCs received within a given time period. However, sending too many PSCs in a radio frame may result in higher overhead and bandwidth loss and may also impose more burden on the SSC detection stage by increasing the number of hypotheses for frame boundary. In one design that is described in much of the following description, two PSCs are sent in a radio frame and may provide a good trade-off between the various considerations noted above. However, the techniques described herein may be used for other designs with more than two PSCs per radio frame.

Figure 2:
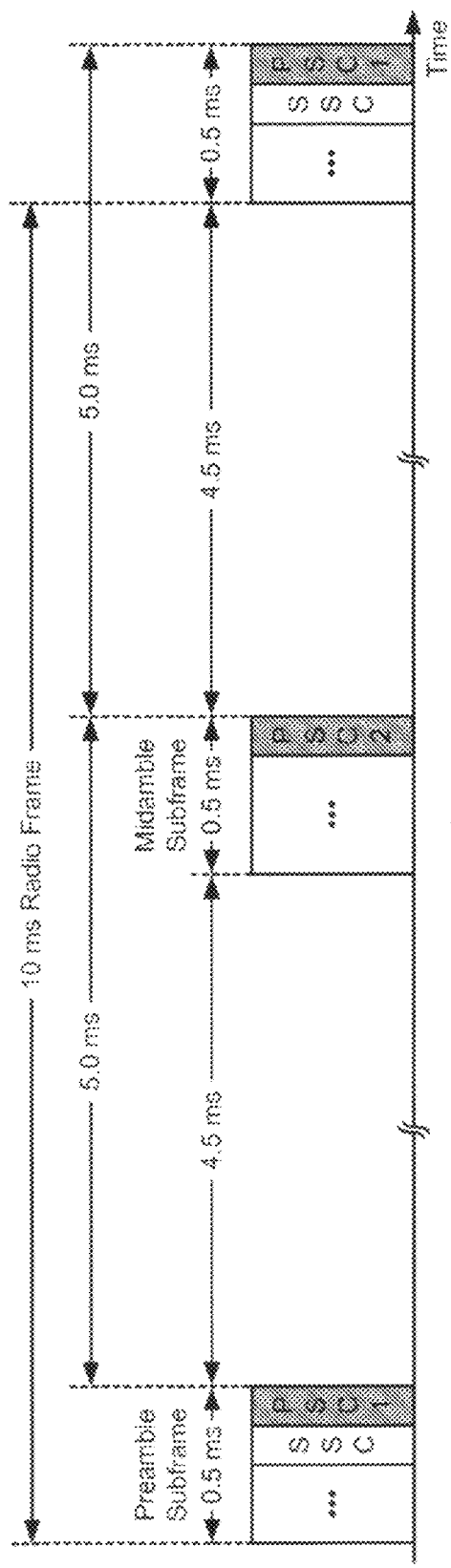
FIG. 2 shows two uniformly spaced PSCs and one SSC.

FIG. 2 shows an example transmission of two PSCs and one SSC in a radio frame with uniform spacing between the PSCs. The radio frame may have a duration of 10 milliseconds (ms) and may be partitioned into 20 subframes, with each subframe having a duration of 0.5 ms, as shown in FIG. 2. A first PSC (PSC1) and the SSC are sent in a preamble subframe, which is the first subframe of the radio frame. A second PSC (PSC2) is sent in a midamble subframe, which is the 11-th subframe of the radio frame. The preamble and midamble subframes may each include multiple symbol periods. PSC1 may be sent in the last symbol period of the preamble subframe, and PSC2 may be sent in the last symbol period of the midamble subframe. The distance from the end of PSC1 to the end of PSC2 may be 5 ms, and the distance from the end of PSC2 to the end of PSC1 in the next radio frame may be 5 ms, as shown in FIG. 2. The spacing between the PSCs would then be uniform with a constant distance of 5 ms between two consecutive PSCs.

FIG. 2 shows use of two different PSCs for the P-SCH. Each PSC may be detected by performing matched filtering on input samples with that PSC. Two matched filters may be used for the two different PSCs and may operate simultaneously on the same input samples to quickly determine whether PSC1 or PSC2 was received. To reduce computational complexity, a single PSC may be used for both PSC1 and PSC2, and the waveforms for PSC1 and PSC2 would then be identical. A single matched filter may then be used to detect for PSC1 sent in the preamble subframe as well as PSC2 sent in the midamble subframe.

With uniform spacing of the PSCs and use of a single PSC for both the preamble and midamble subframes, the P-SCH symbol boundary may be detected by matched filtering the input samples for each sample period or timing hypothesis. The matched filtering would provide a peak whenever a PSC is detected in the input samples. The PSC peaks from the matched filtering would be uniformly spaced apart by approximately 5 ms. Two PSC peaks may be detected in a given radio frame, and there may be ambiguity as to which one of the two PSC peaks corresponds to the radio frame boundary. Hence, there may be two frame boundary hypotheses corresponding to the two PSC peaks. If the SSC is sent in only the preamble subframe as shown in FIG. 2, then SSC detection may be performed for each of the two frame boundary hypotheses. The frame boundary may then be determined when the SSC is detected. However, the processing for SSC detection may be doubled since it may be performed for two frame boundary hypotheses. Furthermore, the SSC detection for each frame boundary hypothesis may be complex if there are many possible values (e.g., many possible cell IDs) for the SSC.

In an aspect, the PSCs are sent with non-uniform spacing, and information is conveyed via the non-equal distances or time intervals between consecutive PSCs. Non-uniform spacing may also be referred to as non-uniform location, non-uniform positioning, etc. The non-uniform spacing may be achieved by sending the PSCs in subframes that are not evenly spaced in a radio frame.

Figure 3:
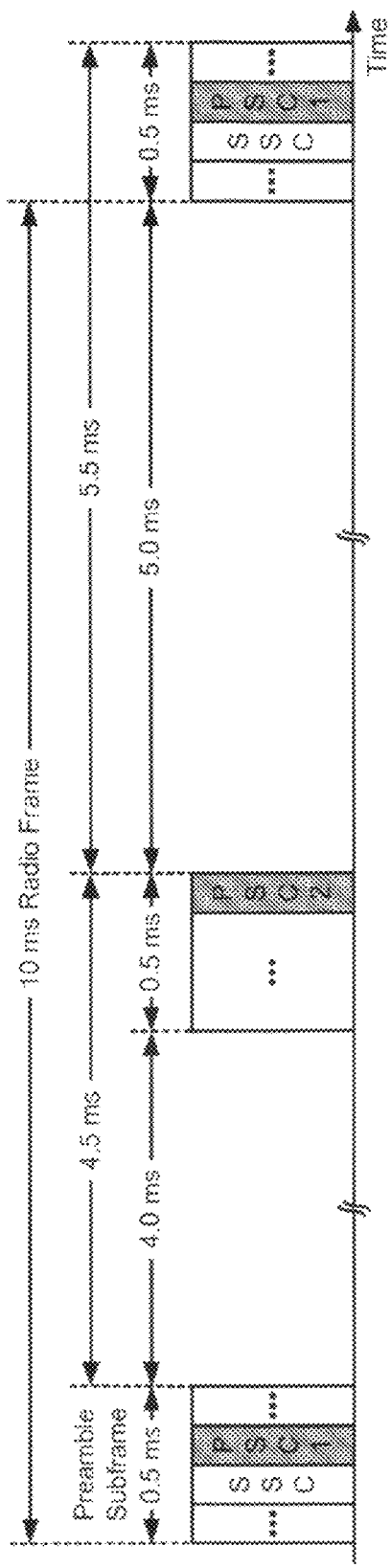
FIG. 3 shows two non-uniformly spaced PSCs and one SSC.

FIG. 3 shows an example transmission of two PSCs and one SSC in a radio frame with non-uniform spacing between the PSCs. In this example, the PSC1 and SSC are sent in the preamble subframe, and the PSC2 is sent in the midamble subframe. However, the distance from the end of the preamble subframe to the end of the midamble subframe ($T_{C1}$) is different from the distance from the end of the midamble subframe to the end of the preamble subframe in the next radio frame ($T_{C2}$). The radio frame may have a duration of 10 ms and may include 20 subframes, with each subframe having a duration of 0.5 ms. PSC1 may be sent in the first subframe, PSC2 may be sent in the 10-th subframe (instead of the 11-th subframe), To may be equal to 4.5 ms, and $T_{c2}$ may be equal to 5.5 ms, as shown in FIG. 3. $T_{C1}$ and $T_{C2}$ may also be other values such that $T_{C1}$ is not equal to $T_{C2}$.

With non-uniform spacing of the PSCs, matched filtering may be performed on the input samples to obtain PSC peaks, as described above. The distances $T_{C1}$ and $T_{C2}$ between the PSC peaks may be used to determine frame boundary even when a single PSC is used for both the preamble and midamble subframes. SSC detection may also be simplified with knowledge of frame boundary.

The non-uniform spacing between the PSCs may be achieved with various frame structures. In general, a radio frame may be of any duration and may include any number of subframes, and the subframes may have the same or different durations.

Figure 4A:
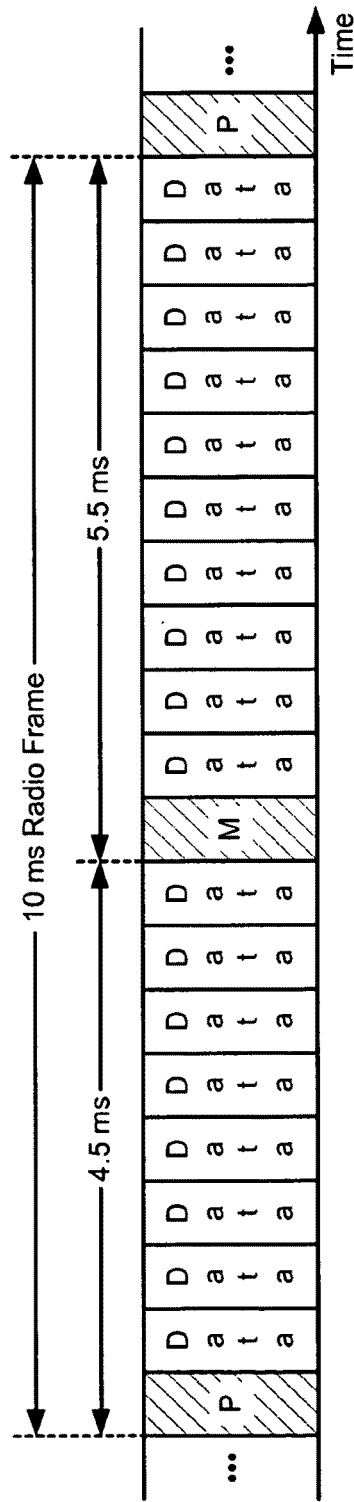
FIGS. 4A and 4B show two non-uniformly spaced PSCs and one SSC in radio frames with equal and unequal subframes, respectively.

FIG. 4A shows transmission of two non-uniformly spaced PSCs and one SSC in a radio frame with subframes of equal duration. In this example, the radio frame includes 20 subframes, with each subframe having a duration of 0.5 ms. PSC1 may be sent in the preamble subframe (denoted as "P" in FIG. 4A), which may be the first subframe of the radio frame. PSC2 may be sent in the midamble subframe (denoted as "M" in FIG. 4A), which may be the 10-th subframe (as shown in 4A), the 12-th subframe, or any subframe other than the 11-th subframe.

Figure 4B:
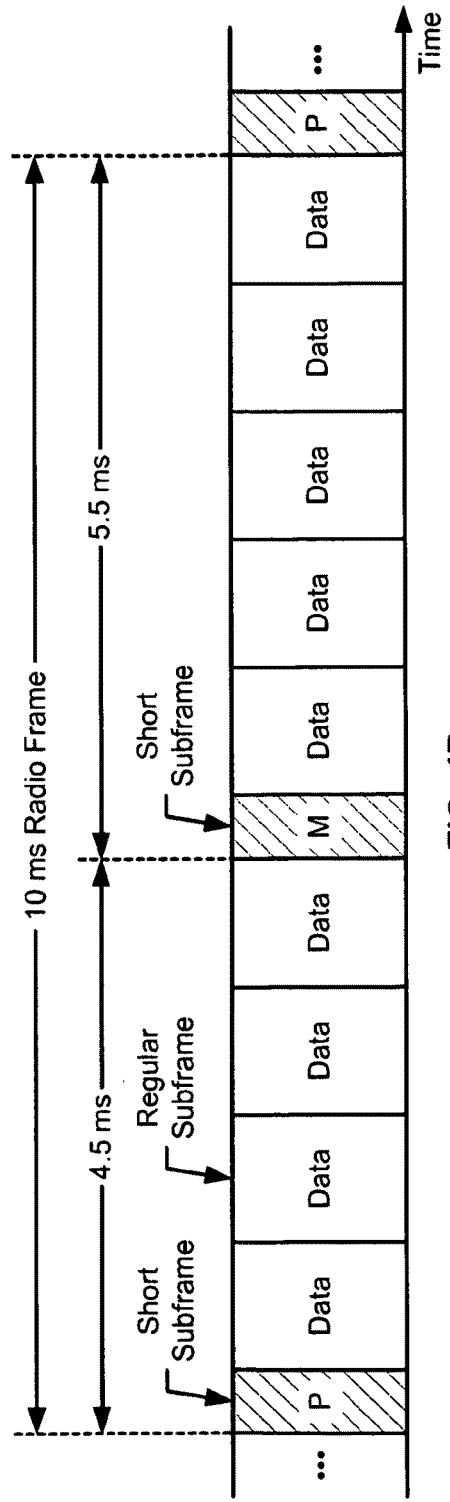

FIG. 4B shows transmission of two non-uniformly spaced PSCs and one SSC in a radio frame with subframes of different durations. In this example, the radio frame include 11 subframes, with the preamble and midamble subframes each having a duration of 0.5 ms, and the remaining subframes each having a duration of 1.0 ms. PSC1 may be sent in the preamble subframe, which may be the first subframe of the radio frame. PSC2 may be sent in the midamble subframe, which may be the 6-th subframe (as shown in 4A), the 7-th subframe, etc.

As shown in FIGS. 4A and 4B, data and/or other information may be sent in the subframes between the preamble and midamble and in the subframes between the midamble and preamble. Non-uniform spacing between the PSCs may be achieved without disrupting or causing discontinuity to the data subframes.

In another aspect, multiple levels of non-uniform spacing of the PSCs are used to convey different types of information. Multiple PSCs may be sent in multiple subframes of a radio frame, and each PSC may be sent in one of multiple symbol periods in a respective subframe, e.g., as shown in FIGS. 2 and 3. Two levels of non-uniform spacing may be achieved with this PSC transmission structure. Subframe-level non-uniform spacing may be achieved by sending the PSCs in non-evenly spaced subframes, e.g., as shown in FIG. 3. Symbol-level non-uniform spacing may be achieved by sending the PSCs in symbol periods selected based on the information being conveyed via the symbol-level non-uniform spacing. In general, a system may employ only subframe-level non-uniform spacing, or only symbol-level non-uniform spacing, or both subframe-level and symbol-level non-uniform spacing.

Figure 5:
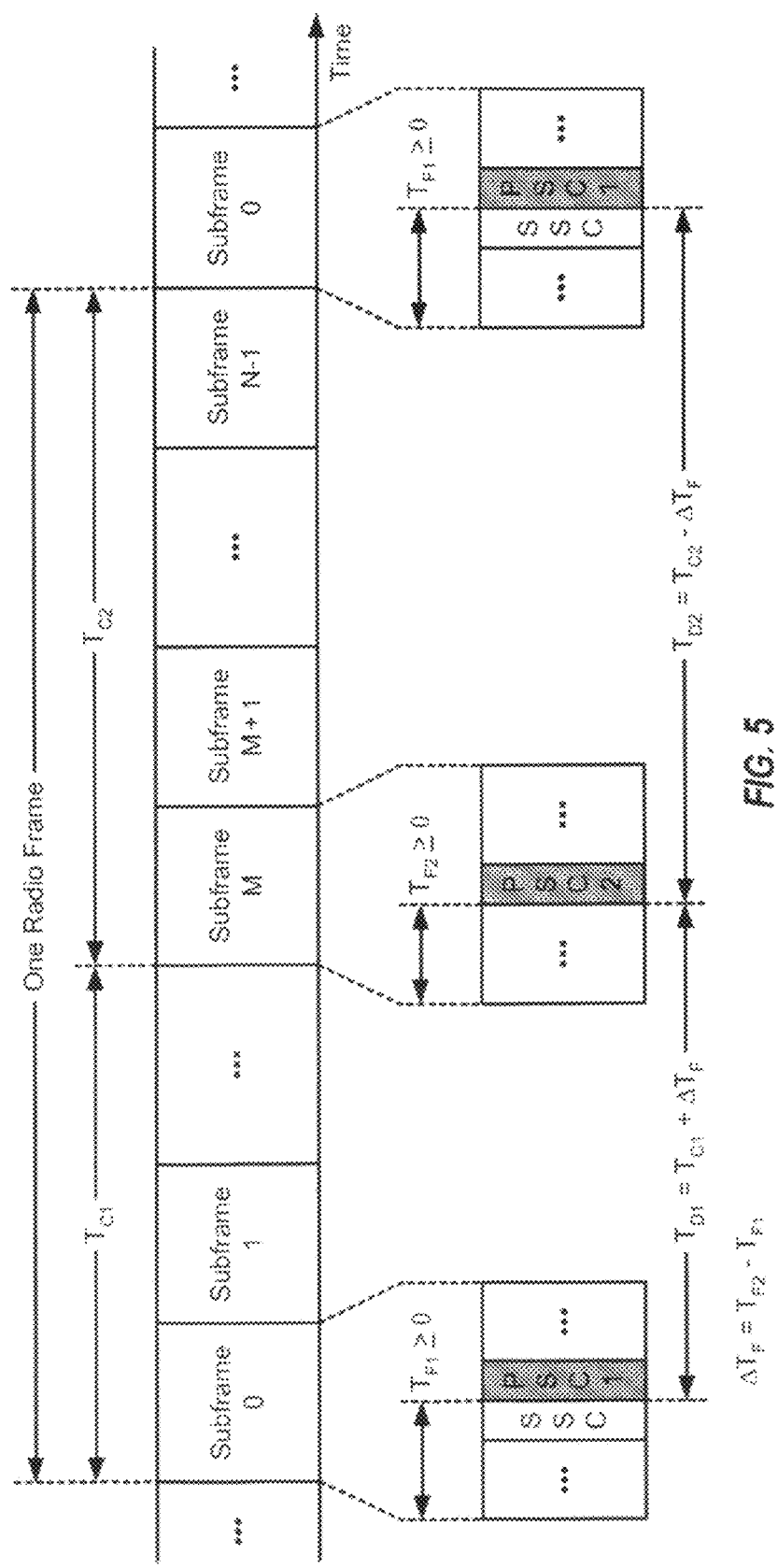
FIG. 5 shows two PSCs and one SSC with subframe-level non-uniform spacing and symbol-level non-uniform spacing.

FIG. 5 shows a design for transmission of two PSCs and one SSC in a radio frame with both subframe-level non-uniform spacing and symbol-level non-uniform spacing. A single PSC may be used for both PSC1 and PSC2 to simplify detection of the PSCs.

For subframe-level non-uniform spacing, the PSC1 and SSC are sent in subframe 0, and the PSC2 is sent in subframe M of a radio frame with N subframes, where M and N may be suitably selected integer values. The distance from the start of subframe 0 with PSC1 to the start of subframe M with PSC2 is $T_{C1}=M$, and the distance from the start of subframe M with PSC2 to the start of the next subframe 0 with PSC1 is $T_{C2}=N-M$, where $T_{C1} \neq T_{C2}$. PSC1 and PSC2 may also be sent in other non-evenly spaced subframes such that $T_{C1} \neq T_{C2}$. It may be advantageous to have a small difference between $T_{C1}$ and $T_u$. If the difference is large, then the benefits (in terms of search time and complexity) of using two PSCs in one radio frame may diminish.

For symbol-level non-uniform spacing, PSC1 is sent in a symbol period that is $T_{F1}$ from the start of subframe 0, and PSC2 is sent in a symbol period that is $T_{F2}$ from the start of subframe M, where in general $T_{F1} \geq 0$ and $T_{F2} \geq 0$. If PSC1 is used as a channel estimate for coherent detection of the SSC in subframe 0, then the SSC may be located as close as possible to PSC1, either before or after PSC1, so that the channel estimate obtained from PSC1 matches the actual channel response observed by the SSC as closely as possible.

The total distance from the start of PSC1 to the start of PSC2 is $T_{D1}=T_{C1}+\Delta T_F$, where $\Delta T_F=T_{F2}-T_F$. The total distance from the start of PSC2 to the start of the next PSC1 is $T_{D2}=T_{C2}-\Delta T_F$. The total distance $T_{D1}$ is composed of the coarse distance $T_{C1}$ and the fine distance $\Delta T_F$, and the total distance $T_{D2}$ is composed of the coarse distance $T_{C2}$ and the fine distance $\Delta T_F$. The coarse distances $T_{C1}$ and $T_{C2}$ may be used to convey certain information, e.g., radio frame boundary. The fine distance $\Delta T_F$ may be used to convey other information. The amount of information that can be conveyed via the fine distance $\Delta T_F$ is dependent on the number of symbol periods available to send PSC1 and PSC2.

In one design, the fine distance $\Delta T_F$ is used to convey cell group information. The available cell IDs in the system may be divided into multiple (G) groups, with each group containing a different subset of all available cell IDs. Each cell may be assigned a specific cell ID from one of the G groups. The use of multiple cell groups may simplify SSC detection. A UE may detect for the PSCs and determine the fine distance $\Delta T_F$ between the PSC peaks. The UE may then perform SSC detection for just one group of cell IDs indicated by the fine distance $\Delta T_F$, instead of all available cell IDs. The number of cell ID hypotheses for the SSC detection stage may thus be reduced by having multiple groups of cell IDs. For example, if three groups are formed, then the processing for SSC detection may be reduced by one third.

In one design, the G groups of cell IDs are assigned different symbol periods for PSC1. Cell IDs in different groups may be assigned to neighboring cells that may strongly interfere each other. By using different symbol periods for PSC1 among the neighboring cells, a UE may be able to obtain channel estimates for specific cells even in a synchronized network. The UE may use the cell-specific channel estimates for coherent detection of the SSC, which may improve performance and reduce complexity.

In one design, PSC2 is sent in the same symbol period by neighboring cells. The system may be operated as a single frequency network (SFN) or may send certain transmissions with SFN operation. SFN refers to synchronized transmission of information from multiple cells, which may improve reception of the information by the UEs. If neighboring cells send PSC2 in the same symbol period, then the UEs may be able to collect more energy for PSC2, which may improve PSC detection performance. The cells may send cell-specific information and cell-specific SSC in the preamble subframe even in SFN operation.

Figure 6:
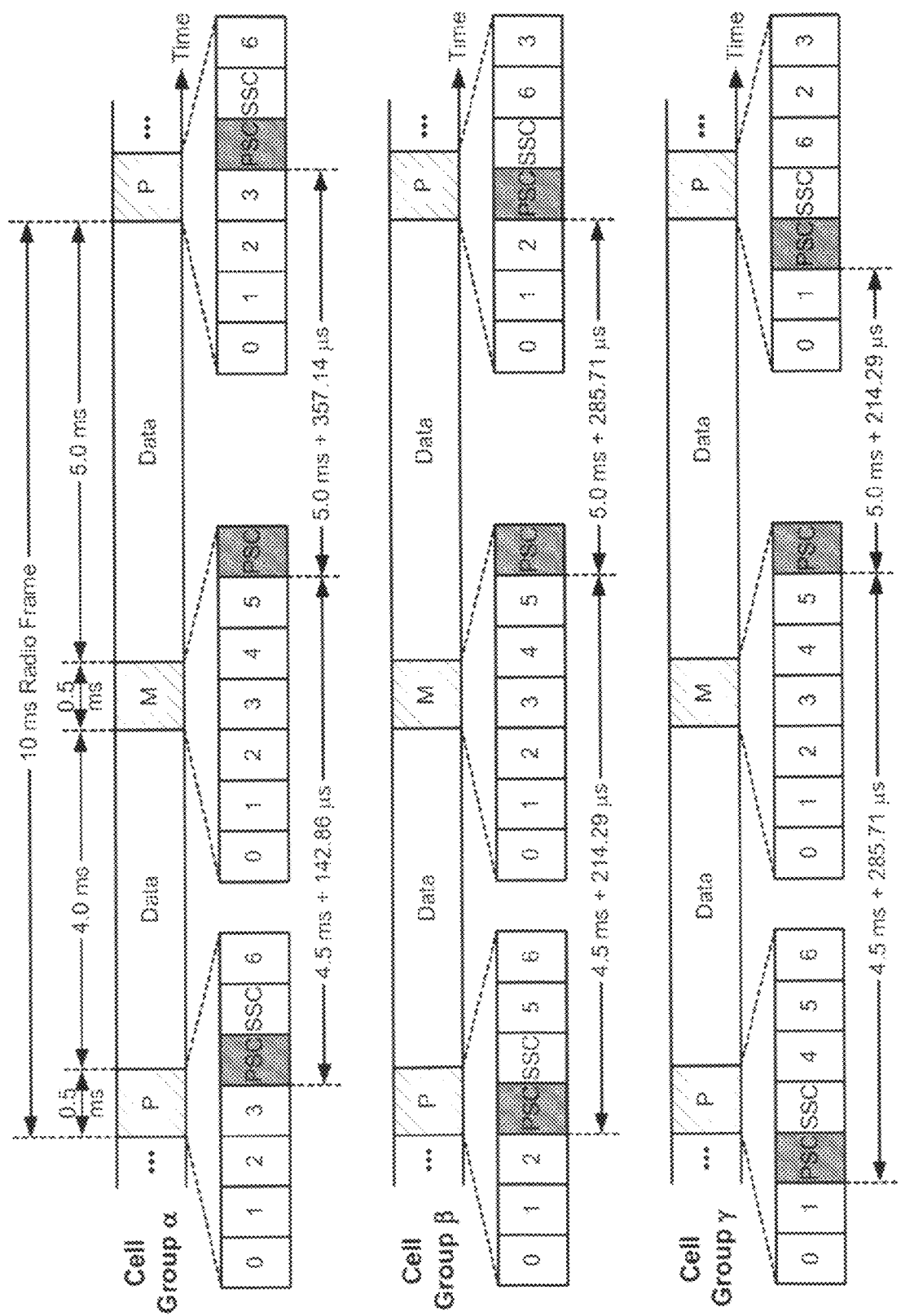
FIGS. 6 and 7 show two non-uniformly spaced PSCs and one SSC for three cell groups with short and long cyclic prefix lengths, respectively.

FIG. 6 shows a design for transmission of two non-uniformly spaced PSCs and one SSC in a radio frame with staggered PSC1. A single PSC may be used for both PSCs to simplify detection of these PSCs. In this design, the radio frame has a duration of 10 ms. The preamble and midamble subframes each has a duration of 0.5 ms and includes seven symbol periods that are assigned indices of 0 through 6. Each symbol period has a duration of 71.43 microseconds (µs). The available cell IDs are divided into three groups that are referred to as cell groups α, β and γ.

For subframe-level non-uniform spacing, the PSC1 and SSC are sent in the preamble subframe, and the PSC2 is sent in the midamble subframe. The distance from the preamble subframe to the midamble subframe is $T_{C1}$=4.5 ms, and the distance from the midamble subframe to the next preamble subframe is $T_{C2}$=5.5 ms. For symbol-level non-uniform spacing, PSC1 for cell group α is sent in symbol period 4 of the preamble subframe, PSC1 for cell group β is sent in symbol period 3, and PSC1 for cell group γ is sent in symbol period 2. PSC2 for all three cell groups is sent in symbol period 6 of the midamble subframe. The SSC for each cell group is sent immediately after PSC1 for that cell group.

For cell group α, the total distance from the start of PSC1 to the start of PSC2 is $T_{D1,\alpha}$=4.5 ms+142.86 µs, the total distance from the start of PSC2 to the start of the next PSC1 is $T_{D2,\alpha}$=5.0 ms+357.14 µs, and the fine distance is $\Delta T_{F,\alpha}$=142.86 µs. For cell group β the total distance from the start of PSC1 to the start of PSC2 is $T_{D1,\beta}$=4.5 ms+214.29 µs, the total distance from the start of PSC2 to the start of the next PSC1 is $T_{D2,\beta}$=5.0 ms+285.71 µs, and the fine distance is $\Delta T_{F,\beta}$=214.29 µs. For cell group γ, the total distance from the start of PSC1 to the start of PSC2 is $T_{D1,\gamma}$=4.5 ms+285.71 µs, the total distance from the start of PSC2 to the start of the next PSC1 is $T_{D2,\gamma}$=5.0 ms+214.29 µs, and the fine distance is $\Delta T_{F,\gamma}$=285.71 µs. Cell groups α, β and γ may thus be distinguished by different fine distances of 142.86, 214.29 and 285.71 µs, respectively.

FIG. 6 shows a specific design for subframe-level and symbol-level non-uniform spacing of the PSCs. For the frame structure shown in FIG. 6, up to 7 cell groups may be assigned up to 7 different symbol periods in the preamble subframe and the same symbol period in the midamble subframe. PSC2 may be sent in the last symbol period of the midamble subframe, as shown in FIG. 6. In this case, the fine distance for cell group g may be given as $\Delta T_{F,g}$=71.43×g µs, for g=0, 1, ..., 6. PSC2 may also be sent in some other symbol period of the midamble subframe. The SSC may be sent in the symbol period before or after PSC1 if the channel estimate from PSC1 is used for SSC detection.

In another design for the frame structure shown in FIG. 6, PSC1 for all cell groups may be sent in a predetermined symbol period of the preamble subframe, and PSC2 for up to 7 cell groups may be sent in up to 7 different symbol periods of the midamble subframe. In this design, the roles of PSC1 and PSC2 are switched, and the SSC may be sent next to PSC2 (instead of PSC1).

In yet another design, different cell groups may be assigned different symbol periods of the preamble subframe as well as different symbol periods of the midamble subframe. For the frame structure shown in FIG. 6, up to 13 cell groups may be assigned different symbol periods of the preamble and midamble subframes such that the fine distance for cell group g may be given as $\Delta T_{F,g}$=71.43×(g−6) µs, for g=0, 1, ..., 12. For g<6, the SSC may be located in the midamble, so that cell-specific channel estimates may be derived in a synchronized network and used for coherent demodulation of the SSC. Furthermore, g=6 may be excluded to ensure cell-specific channel estimation, and the available number of cell groups may be reduced to 12.

In general, for a frame structure with S symbol periods per subframe, up to 2S−1 cell groups may be supported by sending PSC1 in one symbol period of the preamble subframe and sending PSC2 in one symbol period of the midamble subframe. To support coherent demodulation of the SSC in a synchronized network, 2S−2 cell groups may be supported, as described above. The midamble subframe may be selected such that the coarse distance $T_{C1}$ from the preamble subframe to the midamble subframe is either less than or greater than the coarse distance $T_{C2}$ from the midamble subframe to the next preamble subframe. For example, in FIG. 6, the midamble subframe may start 5.0 ms (instead of 4.0 ms) after the end of the preamble subframe or may start any amount other than 4.5 ms after the end of the preamble subframe.

The system may utilize OFDM and/or SC-FDM with a subcarrier structure having K total subcarriers. For OFDM, up to K modulation symbols may be mapped to up to K subcarriers, and zero symbols with signal value of zero may be mapped to the remaining subcarriers, if any. A K-point inverse discrete Fourier transform (IDFT) may then be performed on the K symbols to obtain a useful portion composed of K time-domain samples. The last C samples of the useful portion may be copied and appended to the start of the useful portion to form an OFDM symbol containing K+C samples. The C copied samples are called a cyclic prefix or a guard interval, and C is the cyclic prefix length.

For SC-FDM, Q modulation symbols to be sent in the time domain on Q subcarriers may be transformed to the frequency domain with a Q-point discrete Fourier transform (DFT) to obtain Q transformed symbols, where Q≦K. The Q transformed symbols may be mapped to the Q subcarriers used for transmission, and zero symbols may be mapped to the remaining subcarriers, if any. A K-point IDFT may then be performed on the K symbols to obtain a useful portion composed of K time-domain samples. The last C samples of the useful portion may be copied and appended to the start of the useful portion to form an SC-FDM symbol containing K+C samples The cyclic prefix appended to each OFDM symbol or each SC-FDM symbol may be used to combat intersymbol interference (ISI) caused by delay spread in a multipath channel. A signal transmitted by a cell may reach a UE via multiple signal paths. Delay spread is the difference between the earliest and latest arriving signal copies at the UE. To effectively combat ISI, the cyclic prefix length may be selected to be equal to or greater than the expected delay spread so that the cyclic prefix contains a significant portion of all multipath energies. The cyclic prefix represents a fixed overhead of C samples for each OFDM or SC-FDM symbol.

The system may support multiple cyclic prefix lengths, which may be used to reduce overhead whenever possible. A suitable cyclic prefix length may be selected for use based on the expected delay spread, transmission type, and/or other factors. For example, the system may support two cyclic prefix lengths, a short cyclic prefix length may be used for cell-specific operation, and a long cyclic prefix length may be used for SFN operation. Table 1 gives some parameters associated with the short and long cyclic prefix lengths for the frame structure shown in FIG. 6 in which the preamble and midamble subframes have durations of 0.5 ms.

TABLE 1

| Parameter | Notation | Short Cyclic Prefix Length | Long Cyclic Prefix Length |
|---|---|---|---|
| Number of OFDM/SC-FDM symbols in preamble or midamble subframe | S | 7 | 6 |
| OFDM/SC-FDM symbol duration | $T_{sym}$ | 71.43 µs | 83.34 µs |
| Useful portion duration | $T_u$ | 66.67 µs | 66.67 µs |
| Cyclic prefix length | $T_{cp}$ | 4.76 µs | 16.67 µs |

In yet another aspect, the distances between consecutive PSCs are used to determine the cyclic prefix length used for a received transmission. A UE may not be aware of the cyclic prefix length used by a given cell during cell search. The UE may detect for PSCs and determine the distances between PSC peaks, as described above. The UE may determine the cyclic prefix length used for the PSCs based on the distances. The UE may then perform SSC detection with this knowledge of the cyclic prefix length, which may reduce processing and false detection probability for the SSC.

FIG. 6 shows a design for transmission of two non-uniformly spaced PSCs and one SSC in a radio frame with the short cyclic prefix length given in Table 1. The total distances $T_{D1\_S}$ and $T_{D2\_S}$ for the three cell groups α, β and γ with the short cyclic prefix length are given in Table 2.

Figure 7:
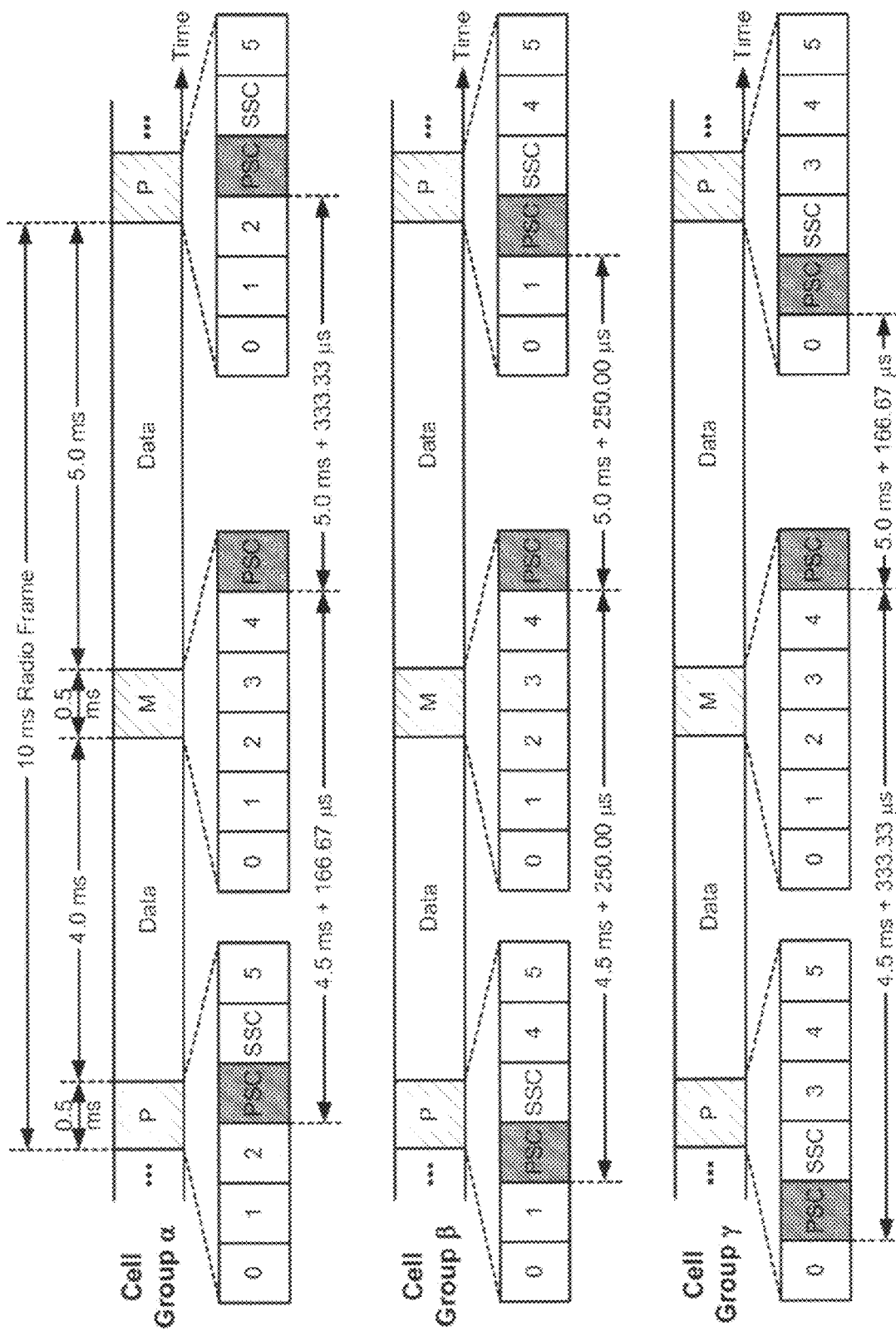

FIG. 7 shows a design for transmission of two non-uniformly spaced PSCs and one SSC in a radio frame with the long cyclic prefix length given in Table 1. In this design, the radio frame has a duration of 10 ms. The preamble and midamble subframes each has a duration of 0.5 ms and includes six symbol periods that are assigned indices of 0 through 5. Each symbol period has a duration of 83.34 µs.

For subframe-level non-uniform spacing, the PSC1 and SSC are sent in the preamble subframe, and the PSC2 is sent in the midamble subframe. The distance from the preamble subframe to the midamble subframe is $T_{C1}$=4.5 ms, and the distance from the midamble subframe to the next preamble subframe is $T_{C2}$=5.5 ms. For symbol-level non-uniform spacing, PSC1 for cell group α is sent in symbol period 3 of the preamble subframe, PSC1 for cell group β is sent in symbol period 2, and PSC1 for cell group γ is sent in symbol period 1. PSC2 for all three cell groups is sent in symbol period 5 of the midamble subframe. The SSC for each cell group is sent immediately after PSC1 for that cell group. The total distances $T_{D1\_L}$ and $T_{D2\_L}$ for the three cell groups α, β and γ with the long cyclic prefix length are given in Table 2.

TABLE 2

| | Short Cyclic Prefix Length | | Long Cyclic Prefix Length | |
|---|---|---|---|---|
| | $T_{D1S}$ | $T_{D2S}$ | $T_{D1L}$ | $T_{D2L}$ |
| Cell group α | 4.643 ms | 5.357 ms | 4.667 ms | 5.333 ms |
| Cell group β | 4.714 ms | 5.286 ms | 4.750 ms | 5.250 ms |
| Cell group γ | 4.786 ms | 5.214 ms | 4.833 ms | 5.167 ms |

In general, the cyclic prefix length may be determined based on the PSCs by ensuring that the total distances $T_{D1}$ and $T_{D2}$ for all cell groups are unique for all supported cyclic prefix lengths. Since $T_{D1}$ +$T_{D2}$ is equal to the radio frame duration, ensuring uniqueness in $T_{D1}$ is equivalent to ensuring uniqueness in $T_{D1}$ and $T_{D2}$. In the designs shown in FIGS. 6 and 7, the total distances are unique and the cyclic prefix length may be determined by (a) not placing PSC1 in the last symbol period of the preamble subframe and (b) placing PSC2 in the last symbol period of the midamble subframe. The cyclic prefix length may also be determined by placing PSC2 in any symbol period of the midamble subframe.

In the designs shown in FIGS. 6 and 7, the smallest difference between any $T_{D1\_S}$ with the short cyclic prefix length and any $T_{D1\_L}$ with the long cyclic prefix length is 24 µs. This smallest difference corresponds to $T_{D1\_S}$ of 4.667 ms and $TD_{1\_L}$ of 4.643 ms for cell group α. A larger smallest difference may be obtained by selecting other symbol periods for PSC1 and/or PSC2. In general, a larger smallest difference may improve the UEs' capability to resolve between the short and long cyclic prefix lengths in a multipath channel.

In general, uniqueness for the total distances $T_{D1}$ and $T_{D2}$ for different cell groups and cyclic prefix lengths may be achieved by selecting appropriate symbol periods and subframes for PSC1 and PSC2 based on the numerology applicable for the system, e.g., the frame duration, subframe duration, symbol duration, cyclic prefix lengths, etc. The cyclic prefix length may be determined based on $T_{D1}$ and/or $T_{D2}$ obtained from the PSC peaks.

The P-SCH described herein allows for detection of frame boundary, cell group, and cyclic prefix length in the PSC detection stage. In the designs described above, the frame boundary may be resolved by placing PSC1 and PSC2 such that the distance from PSC1 to PSC2 and the distance from PSC2 to the next PSC1 are different in subframe granularity. The cell group may be resolved by placing PSC1 (or PSC2) in different symbols of one subframe depending on the cell group and by placing PSC2 (or PSC1) in a predetermined symbol of another subframe. The placement of PSC1 (or PSC2) in different symbols allows for derivation of cell-specific channel estimates even in a synchronized network. The cyclic prefix length may be resolved by placing PSC1 and PSC2 such that unique distances are obtained for different supported cyclic prefix lengths. The frame boundary, cell group, and cyclic prefix length may also be resolved with other non-uniform placements of the PSCs. A single PSC may be used for both PSC1 and PSC2 to reduce PSC detection (e.g., matched filtering) complexity.

The SSC may be placed at a known time offset relative to PSC1 (or PSC2). The location of the SSC would then be known after completing PSC detection. The channel estimate obtained from PSC1 (or PSC2) may be used for coherent detection of the SSC, which may improve SSC detection performance and reduce complexity. The SSC may be cell specific and may convey cell ID or other information.

1. P-SCH and S-SCH Sequences

Cell search may be relatively complex and may consume much battery power for a handheld device. Low complexity and high detection performance are thus desirable for both the P-SCH and S-SCH. Improved detection performance may be achieved for the S-SCH by using the P-SCH as channel estimate. The P-SCH may then be designed to provide good channel estimation and frequency offset estimation performance.

A P-SCH sequence is a synchronization sequence or code used to generate the PSCs sent on the P-SCH. A P-SCH sequence may be selected based on various considerations such as performance (e.g., in terms of timing search, frequency offset correction, and channel estimation) and the operational (e.g., PSC detection) complexity.

A P-SCH sequence may be defined based on a CAZAC (constant amplitude zero auto-correlation) sequence. Some example CAZAC sequences include a Chu sequence, a Frank sequence, a generalized chirp-like (GCL) sequence, a Golomb sequence, P1, P3, P4 and Px sequences, etc. CAZAC sequences can provide zero auto-correlation, which is useful in accurately estimating the channel response and reducing the amount of time for timing search. The GCL and Chu sequences may have ambiguity between timing offset and frequency offset. The Frank sequence may have degraded partial correlation performance. Partial correlation is correlation over a portion of a sequence instead of the entire sequence.

In one design, a P-SCH sequence is defined based on a generalized (or modulated) Frank sequence. A Frank sequence $f(n)$ may be expressed as:

$$f(n) = e^{j\frac{2\pi p(n \text{div} L+1)(n \text{mod} L+1)}{L}}, \text{ for } n = 0, \ldots, L^2 - 1, \quad \text{Eq (1)}$$

where $L^2$ is the length of the Frank sequence, and L and p may be any positive integer values relatively prime of each other.

A generalized Frank sequence $g(n)$ may then be derived as follows:

$$g(n)=f(n) \times pn(n), \text{ for } n=0, \ldots, L^2-1, \quad \text{Eq(2)}$$

where $pn(n)$ is a pseudo-noise (PN) sequence of constant magnitude.

To obtain good partial correlation performance, a base sequence of length L having good auto-correlation property may be generated in any manner known in the art. For example, the base sequence may be a Golay sequence, a Golay complementary sequence, etc. The base sequence may be repeated L times and concatenated to generate the $pn(n)$ sequence of length $L^2$. For example, a generalized Frank sequence of length 64 may be generated by multiplying a 64-long Frank sequence with a 64-long PN sequence obtained by repeating an 8-long Golay complementary sequence {1, 1, 1, −1, 1, 1, −1, 1} eight times.

The product of the L repetitions of the L-long base sequence with good auto-correlation property and the $L^2$-long Frank sequence may improve segmented or partial correlation and energy combining performance. The repeated base sequence may suppress multi-path interference, which may contribute to the improvement. After timing and frequency offset correction, an accurate channel estimate may be obtained (due to the CAZAC property of the Frank sequence) by performing full correlation with the generalized Frank sequence.

In another design, a pair of P-SCH sequences $p_1(n)$ and $p_2(n)$ of length 2L may be defined based on Golay complementary sequences (GCS) of length L, as follows:

$$p_1(n)=CP+A+B, \text{ and}$$

$$P_2(n)=CP+B+A \quad \text{(3)}$$

where A and B are Golay complementary sequences from the same GCS pair, and CP is the cyclic prefix. A Golay generator can generate one L-long segment from an upper branch and another L-long segment from a lower branch. For example, P-SCH sequences of length 64 (not counting the cyclic prefix) may be generated with two segments of 32-long Golay complementary sequences for A and B. P-SCH sequences may also be generated based on hierarehical Golay complementary sequences, which are Golay complementary sequences generated with hierarehical construction.

A UE may perform correlation on input samples with a PSC correlator to obtain correlation results for both sequences A and B in each sample period and may store the correlation results. In each sample period, the UE may combine the correlation results obtained for sequences A and B in that sample period with the correlation results obtained for sequences B and A in L sample periods earlier to obtain full correlation results for concatenated sequences A+B and B+A. The UE may thus efficiently perform full correlations for both A+B and B+A based on partial correlation results for A and B. The UE may also use the correlation result for A (or B) and the correlation result for B (or A) from L sample periods earlier to determine the phase difference between the two segments. The UE may use this phase difference for initial frequency error estimation.

Either $p_1(n)$ or $p_2(n)$ may be used for a PSC depending on one bit of information to be sent via the PSC. For example, $p_1(n)$ may be used to convey short cyclic prefix length, and $p_2(n)$ may be used to convey long cyclic prefix length. If two PSCs are sent in a radio frame as described above, then more than one bit of information may be conveyed via the two PSCs through the choice of $p_1(n)$ and/or $p_2(n)$.

Alternatively, a pair of P-SCH sequences $p_1'(n)$ and $p_2'(n)$ of length L may be defined based on Golay complementary sequences of length L, as follows:

$$p_1'(n)=CP+A, \text{ and}$$

$$p_2'(n)=CP+B \quad \text{Eq (4)}$$

Either $p;(n)$ or $p_2'(n)$ may be used for each PSC in a radio frame depending on one bit of information to be sent via the PSCs. For example, $p_1'(n)$ may be used for PSC1 and $p_2'(n)$ may be used for PSC2 to indicate cyclic prefix length or some other information.

The GCS pair may also be used for different cells in the system. The cells may be arranged into groups. Each group may be assigned a different P-SCH sequence (instead of the same P-SCH sequence for all cells), which may allow the UEs to derive more accurate channel estimates based on the PSCs.

A P-SCH sequence may also be obtained by (e.g., exhaustively) searching for synchronization sequences with low implementation complexity and good correlation properties.

An S-SCH sequence is a synchronization sequence or code used to generate the SSC sent on the S-SCH. An S-SCH sequence may convey information such as cell ID, the number of transmit antennas at a Node B, the system bandwidth, etc. Different S-SCH sequences may be defined for different possible cell IDs, one S-SCH sequence for each cell ID. For SSC detection, the input samples may be correlated with different S-SCH sequences corresponding to different cell ID hypotheses.

In one design, the S-SCH sequences are defined based on orthogonal or pseudo-orthogonal sequences with a large set size. For example, many pseudo-orthogonal sequences may be generated with one or more base sequences and different time shifts. The base sequences may be a GCL or Chu sequence with different sequence indices, frequency-domain PN sequences, etc. A set of pseudo-orthogonal sequences may be selected based on correlation property and complexity. The number of pseudo-orthogonal sequences in the set may be determined based on the number of possible hypotheses for information sent on the S-SCH, e.g., the number of possible cell IDs if only this information is sent on the S-SCH.

In another design, the S-SCH sequences are defined based on phase-modulated pseudo-orthogonal sequences, which can exploit the channel estimate obtained from the P-SCH. A set of pseudo-orthogonal sequences may be generated. The phase angle of each symbol of a given pseudo-orthogonal sequence may be shifted by the same amount based on a modulation scheme such as BPSK, QPSK, etc. The number of hypotheses to be resolved by the pseudo-orthogonal sequences may be reduced by ½ for BPSK, ¼ for QPSK, or even more for modulation schemes of higher order than QPSK.

FIG. 8 shows a process 800 performed by a Node B to support cell search by the UEs. First and second synchronization transmissions are generated based on a synchronization sequence (block 812). The synchronization sequence may be derived based on a CAZAC sequence, or a PN sequence, or both, e.g., as shown in equation (2). The synchronization sequence may also be derived based on Golay complementary sequences, e.g., as shown in equation (3) or (4). The first and second synchronization transmissions may also be generated based on one of multiple cyclic prefix lengths. The first synchronization transmission is sent in a first location of a frame (block 814). The second synchronization transmission is sent in a second location of the frame (block 816). A first distance between the first and second locations of the frame is different from a second distance between the second location of the frame and the first location of a next frame. The first and second synchronization transmissions may correspond to the PSCs sent on the P-SCH.

The frame may comprise multiple subframes, and the first and second locations may be in different subframes of the frame. The first location may be in a subframe at the start of the frame, and the second location may be in a subframe nearest to, but not at, the middle of the frame. A first number of subframes corresponding to the first distance may be different from a second number of subframes corresponding to the second distance. Each subframe may comprise multiple symbol periods. The multiple groups of cell IDs may be associated with (a) different symbol periods for the first synchronization transmission and (b) the same symbol period for the second synchronization transmission.

A third (or secondary) synchronization transmission may be sent in a third location of the frame, with the third location being a predetermined offset from the first location (block 818). For example, the first and third locations may be in adjacent symbol periods. The third synchronization transmission may correspond to the SSC sent on the S-SCH.

FIG. 9 shows an apparatus 900 supporting cell search by the UEs. Apparatus 900 includes means for generating first and second synchronization transmissions based on a synchronization sequence (module 912), means for sending the first synchronization transmission in a first location of a frame (module 914), and means for sending the second synchronization transmission in a second location of the frame with a first distance between the first and second locations of the frame being different from a second distance between the second location of the frame and the first location of a next frame (module 916). Apparatus 900 further includes means for sending a third synchronization transmission in a third location of the frame, with the third location being a predetermined offset from the first location (module 918). Modules 912 to 918 may comprise processors, electronics devices, hardware devices, electronics components, logical circuits, memories, etc., or any combination thereof.

Figure 10:
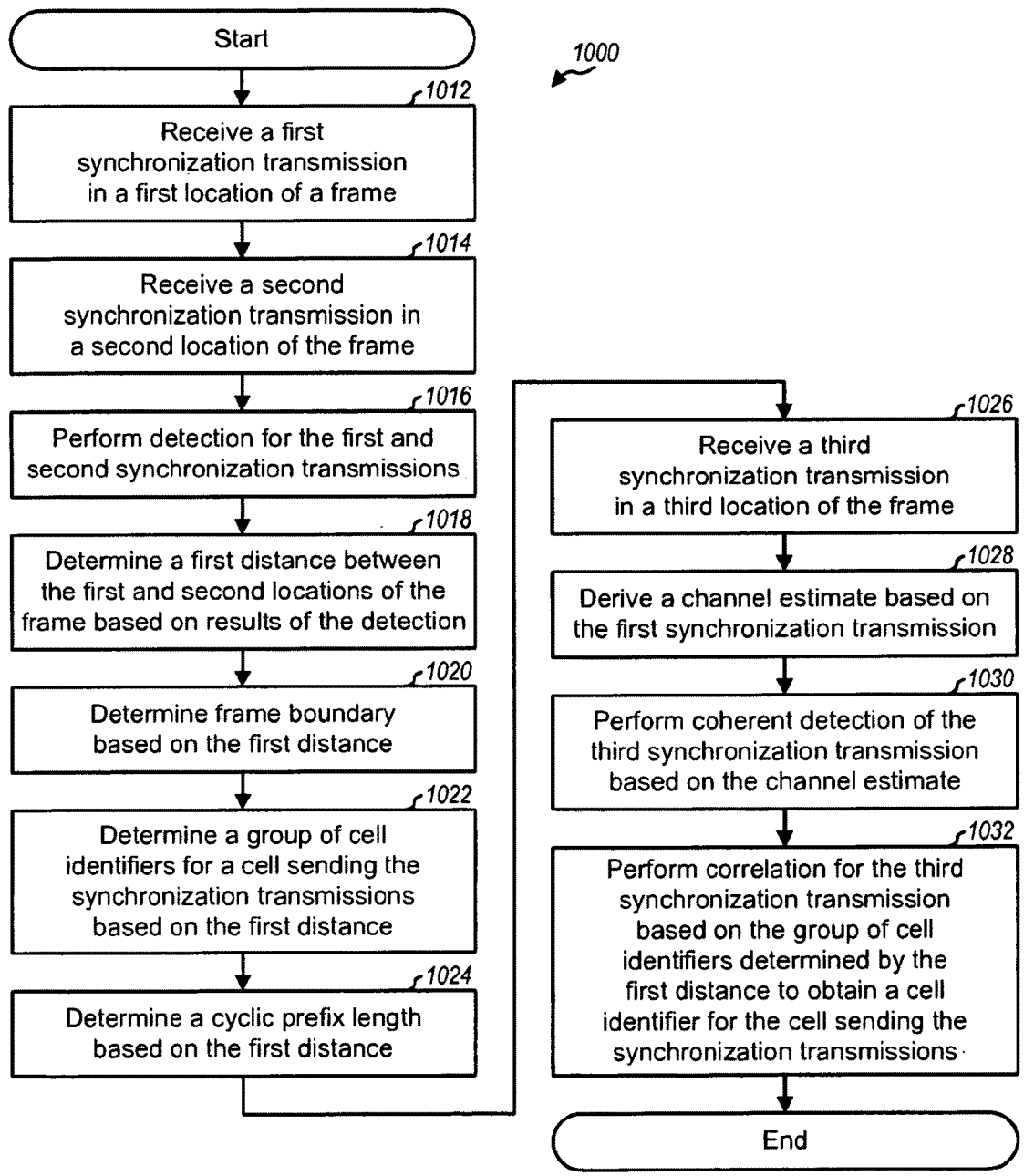
FIG. 10 shows a process performed by a UE for cell search.

FIG. 10 shows a process 1000 performed by a UE for cell search. A first synchronization transmission is received in a first location of a frame (block 1012), and a second synchronization transmission is received in a second location of the frame (block 1014). Detection is performed for the first and second synchronization transmissions, e.g., based on a single matched filter if the two synchronization transmissions are generated with the same synchronization sequence (block 1016). A first distance between the first and second locations of the frame is determined based on results of the detection (block 1018). The first distance may be given as $T_{D1}=T_{C1}+\Delta T_F$ and may be composed of a coarse distance $T_{C1}$ and a fine distance $\Delta T_F$. The first distance is different from a second distance between the second location of the frame and the first location of a next frame. For block 1016, input samples may be correlated with the synchronization sequence to detect for the first and second synchronization transmissions. The first and second locations may then be determined based on the correlation results.

Frame boundary may be determined based on the first distance, e.g., based on the coarse distance $T_{C1}$ (block 1020). A group of cell identifiers for a cell sending the first and second synchronization transmissions may also be determined based on the first distance, e.g., based on the fine distance $\Delta T_F$ (block 1022). A cyclic prefix length may also be determined based on the first distance (block 1024). Blocks 1020, 1022 and 1024 may be performed based solely on the first distance. Alternatively, the second distance may also be determined and used in blocks 1020, 1022 and 1024, which may reduce error.

A third synchronization transmission may be received in a third location of the frame, with the third location being a predetermined offset from the first location (block 1026). A channel estimate may be derived based on the first synchronization transmission (block 1028). Coherent detection of the third synchronization transmission may be performed based on the channel estimate (block 1030). Correlation for the third synchronization transmission may be performed based on the group of cell IDs determined by the first distance to obtain a cell ID for the cell sending the synchronization transmissions (block 1032).

Figure 11:
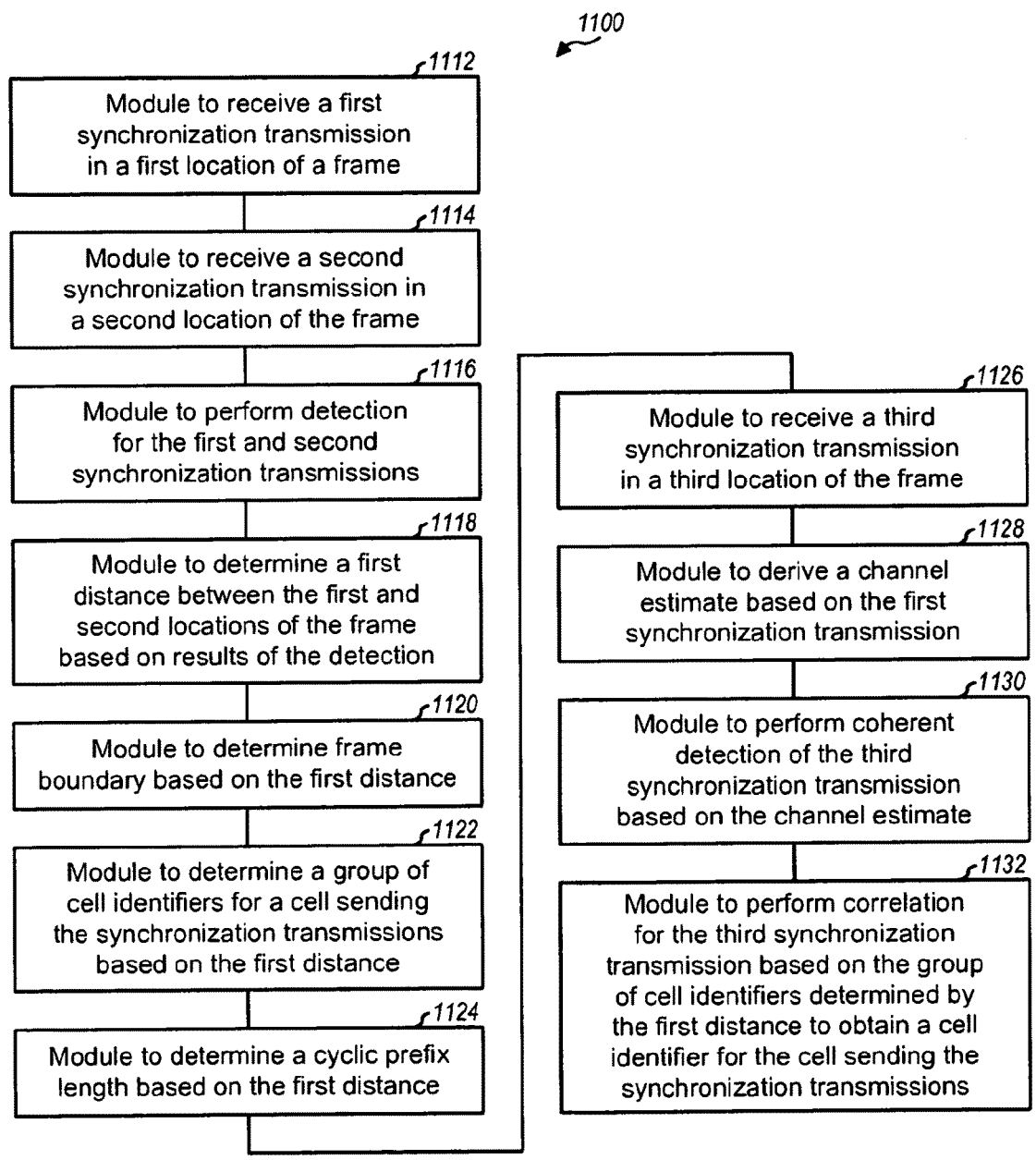
FIG. 11 shows an apparatus for performing cell search.

FIG. 11 shows an apparatus 1100 for performing cell search. Apparatus 1100 includes means for receiving a first synchronization transmission in a first location of a frame (module 1112), means for receiving a second synchronization transmission in a second location of the frame (module 1114), means for performing detection for the first and second synchronization transmissions (module 1116), and means for determining a first distance between the first and second locations of the frame based on results of the detection, with the first distance being different from a second distance between the second location of the frame and the first location of a next frame (module 1118). Apparatus 1100 further includes means for determining frame boundary based on the first distance (module 1120), means for determining a group of cell IDs for a cell sending the first and second synchronization transmissions based on the first distance (module 1122), and means for determining a cyclic prefix length based on the first distance (module 1124).

Apparatus 1100 further includes means for receiving a third synchronization transmission in a third location of the frame, with the third location being a predetermined offset from the first location (module 1126), means for deriving a channel estimate based on the first synchronization transmission (module 1128), means for performing coherent detection of the third synchronization transmission based on the channel estimate (module 1130), and means for performing correlation for the third synchronization transmission based on the group of cell IDs determined by the first distance to obtain a cell ID for the cell sending the synchronization transmissions (module 1132). Modules 1112 to 1132 may comprise processors, electronics devices, hardware devices, electronics components, logical circuits, memories, etc., or any combination thereof.

FIG. 12 shows a process 1200 performed by a UE for cell search in a synchronized network. A primary synchronization transmission is received from a first cell in a first location of a frame, with the first location being non-overlapping with at least one other location used for at least one other primary synchronization transmission sent by at least one neighboring cell in the synchronized network (block 1212). A secondary synchronization transmission is received from the first cell in a second location of the frame (block 1214). A channel estimate for the first cell is derived based on the primary synchronization received from the first cell (block 1216). Coherent detection of the secondary synchronization transmission received from the first cell is performed based on the channel estimate (block 1218). Primary synchronization transmissions may also be received from the first cell and the at least one neighboring cell in a third location of the frame. The primary synchronization transmissions that are overlapping among neighboring cells in the synchronized network may be used to improve reception of the primary synchronization transmission. The primary synchronization transmissions that are non-overlapping among neighboring cells may be used to obtain cell-specific channel estimates.

FIG. 13 shows an apparatus 1300 for performing cell search. Apparatus 1300 includes means for receiving a primary synchronization transmission from a first cell in a first location of a frame, with the first location being non-overlapping with at least one other location used for at least one other primary synchronization transmission sent by at least one neighboring cell (module 1312), means for receiving a secondary synchronization transmission from the first cell in a second location of the frame (module 1314), means for deriving a channel estimate for the first cell based on the primary synchronization received from the first cell (module 1316), and means for performing coherent detection of the secondary synchronization transmission received from the first cell based on the channel estimate (module 1318). Modules 1312 to 1318 may comprise processors, electronics devices, hardware devices, electronics components, logical circuits, memories, etc., or any combination thereof.

Figure 14:
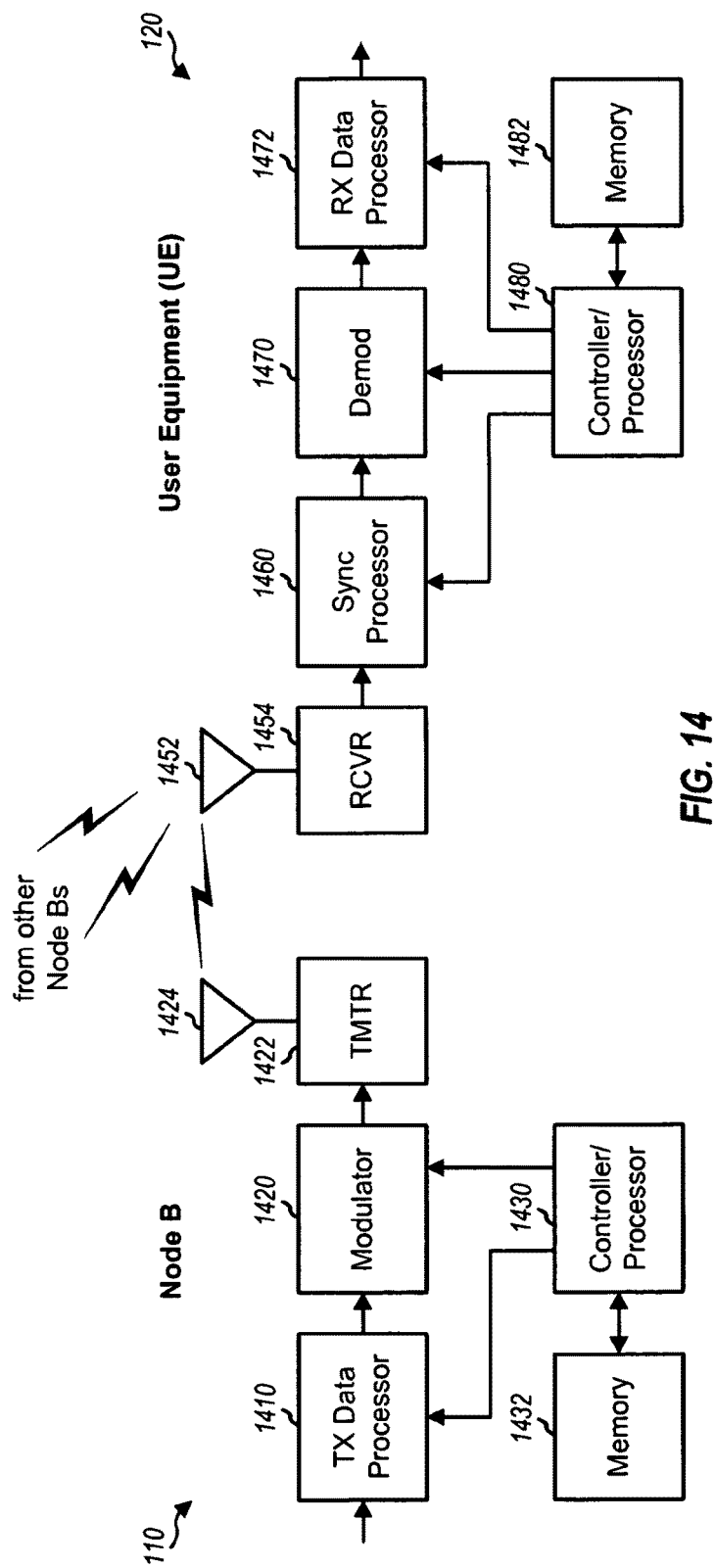
FIG. 14 shows a block diagram of the Node B and UE.

FIG. 14 shows a block diagram of a design of a Node B 110 and a UE 120, which are one of the Node Bs and UEs in FIG. 1. At Node B 110, a transmit (TX) data processor 1410 processes (e.g., encodes, interleaves, and symbol maps) traffic data and generates data symbols. Processor 1410 also generates signaling symbols for overhead channels (e.g., the P-SCH and S-SCH) and pilot symbols for a pilot channel. A modulator 1420 processes the data, signaling, and pilot symbols as specified by the system and provides output chips. Modulator 1420 may perform modulation for OFDM, SC-FDM, CDMA, etc. A transmitter (TMTR) 1422 processes (e.g., converts to analog, amplifies, filters, and frequency upconverts) the output chips and generates a downlink signal, which is transmitted via an antenna 1424.

At UE 120, an antenna 1452 receives downlink signals from Node B 110 and other Node Bs and provides a received signal. A receiver (RCVR) 1454 conditions (e.g., filters, amplifies, frequency downconverts, and digitizes) the received signal and provides input samples. A synchronization (Sync) processor 1460 performs detection for the P-SCH and S-SCH based on the input samples and provides detected Node Bs or cells. Processor 1460 may derive a channel estimate for each detected Node B based on its PSC and perform coherent detection of the SSC with the channel estimate. Processor 1460 may provide various types of information such as frame boundary, cell ID, and cyclic prefix length for each detected Node B. A demodulator (Demod) 1470 processes the input samples based on the information from sync processor 1460 and also in a manner complementary to the processing by modulator 1420 to obtain symbol estimates. A receive (RX) data processor 1472 processes (e.g., symbol demaps, deinterleaves, and decodes) the symbol estimates and provides decoded data and signaling. In general, the processing by demodulator 1470 and RX data processor 1472 is complementary to the processing by modulator 1420 and TX data processor 1410, respectively, at Node B 110.

Controllers/processors 1430 and 1480 direct the operation of various processing units at Node B 110 and UE 120, respectively. Processor 1430 may implement process 800 in FIG. 8 and/or other processes to support cell search by the UEs. Processor 1480 may implement process 1000 in FIG. 10 and/or other processes to perform cell search to detect for Node Bs. Memories 1432 and 1482 store data and program codes for Node B 110 and UE 120, respectively.

The techniques described herein may be implemented by various means. For example, these techniques may be implemented in hardware, firmware, software, or a combination thereof. For a hardware implementation, the processing units at an entity (e.g., a Node B or a UE) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 1432 or 1482 in FIG. 14) and executed by a processor (e.g., processor 1430 or 1480). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   a processor configured to send a first synchronization transmission in a first location of a frame, and to send a second synchronization transmission in a second location of the frame, wherein a first distance between the first and second locations of the frame is different from a second distance between the second location of the frame and the first location of a next frame; and a memory coupled to the processor, wherein the processor is configured to use a cyclic prefix length based on the first distance.

2. The apparatus of claim 1, wherein the frame comprises a plurality of subframes, wherein the first location is in a first subframe of the frame, and wherein the second location is in a second subframe of the frame, the first and second subframes corresponding to any two of the plurality of subframes in the frame.

3. The apparatus of claim 2, wherein the first subframe is at start of the frame and the second subframe is nearest to but not at middle of the frame.

4. The apparatus of claim 2, wherein a first number of subframes corresponding to the first distance is different from a second number of subframes corresponding to the second distance.

5. The apparatus of claim 2, wherein a plurality of groups of cell identifiers (IDs) are associated with a plurality of symbol periods in the first subframe, and wherein the first location corresponds to one of the plurality of symbol periods in the first subframe.

6. The apparatus of claim 5, wherein the processor is configured to determine a symbol period in the first subframe for the first synchronization transmission based on a group of cell IDs for a cell sending the first and second synchronization transmissions.

7. The apparatus of claim 5, wherein the plurality of groups of cell IDs are associated with a predetermined symbol period in the second subframe.

8. The apparatus of claim 1, wherein the frame comprises a plurality of symbol periods, and wherein the number of symbol periods corresponding to the first distance is one of a plurality of possible numbers of symbol periods for the first distance.

9. The apparatus of claim 1, wherein the processor is configured to generate the first and second synchronization transmissions based on a synchronization sequence derived based on at least one of a CAZAC (constant amplitude zero auto-correlation) sequence, a pseudo-noise (PN) sequence, a Golay sequence, and a Golay complementary sequence.

10. The apparatus of claim 1, wherein the processor is configured to send a third synchronization transmission in a third location of the frame, the third location being a predetermined offset from the first location.

11. The apparatus of claim 10, wherein the first and third locations are in adjacent symbol periods.

12. The apparatus of claim 1, wherein the processor is configured to send the first and second synchronization transmissions on a primary synchronization channel (P-SCH).

13. The apparatus of claim 10, wherein the processor is configured to send the third synchronization transmission on a secondary synchronization channel (S-SCH).

14. An apparatus comprising:
a processor configured to send a first synchronization transmission in a first location of a frame, and to send a second synchronization transmission in a second location of the frame, wherein a first distance between the first and second locations of the frame is different from a second distance between the second location of the frame and the first location of a next frame; and
a memory coupled to the processor, wherein the processor is configured to generate the first and second synchronization transmissions based on one of multiple cyclic prefix lengths.

15. An apparatus comprising:
a processor configured to send a first primary synchronization code (PSC) on a primary synchronization channel (P-SCH) in a first location of a frame, and to send a second PSC on the P-SCH in a second location of the frame, wherein a first distance between the first and second locations of the frame is different from a second distance between the second location of the frame and the first location of a next frame; and
a memory coupled to the processor, wherein the processor is configured to use a cyclic prefix length based on the first distance.

16. A method comprising:
sending a first synchronization transmission in a first location of a frame;
sending a second synchronization transmission in a second location of the frame, wherein a first distance between the first and second locations of the frame is different from a second distance between the second location of the frame and the first location of a next frame; and
using a cyclic prefix length based on the first distance.

17. The method of claim 16, wherein the frame comprises a plurality of subframes, and wherein a first number of subframes corresponding to the first distance is different from a second number of subframes corresponding to the second distance.

18. The method of claim 17, wherein each subframe comprises a plurality of symbol periods, and wherein the number of symbol periods corresponding to the first distance is one of a plurality of possible numbers of symbol periods for the first distance.

19. The method of claim 16, wherein a plurality of groups of cell identifiers (IDs) are associated with a plurality of possible symbol periods for the first synchronization transmission, and wherein the method further comprises:
determining a symbol period for the first synchronization transmission based on a group of cell IDs for a cell sending the first and second synchronization transmissions.

20. The method of claim 16, further comprising:
sending a third synchronization transmission in a third location of the frame, the third location being a predetermined offset from the first location.

21. An apparatus comprising:
means for sending a first synchronization transmission in a first location of a frame;
means for sending a second synchronization transmission in a second location of the frame, wherein a first distance between the first and second locations of the frame is different from a second distance between the second location of the frame and the first location of a next frame; and
means for using a cyclic prefix length based on the first distance.

22. The apparatus of claim 21, wherein a plurality of groups of cell identifiers (IDs) are associated with a plurality of possible symbol periods for the first synchronization transmission, and wherein the apparatus further comprises:
means for determining a symbol period for the first synchronization transmission based on a group of cell IDs for a cell sending the first and second synchronization transmissions.

23. The apparatus of claim 21, further comprising:
means for sending a third synchronization transmission in a third location of the frame, the third location being a predetermined offset from the first location.

24. A computer program product including non-transitory computer-readable medium including instructions, the set of instructions, comprising:
a first instruction set for sending a first synchronization transmission in a first location of a frame;
a second instruction set for sending a second synchronization transmission in a second location of the frame, wherein a first distance between the first and second locations of the frame is different from a second distance between the second location of the frame and the first location of a next frame; and
a third instruction for using a cyclic prefix length based on the first distance.

25. The computer program product of claim 24, further comprising:
a fourth instruction set for sending a third synchronization transmission in a third location of the frame, the third location being a predetermined offset from the first location.

26. An apparatus comprising:
a processor configured to receive a first synchronization transmission in a first location of a frame, to receive a second synchronization transmission in a second location of the frame, to perform detection for the first and second synchronization transmissions, and to determine a first distance between the first and second locations of the frame, the first distance being different from a second distance between the second location of the frame and the first location of a next frame; and
a memory coupled to the processor, wherein the processor is configured to determine a cyclic prefix length used by a cell sending the first and second synchronization transmissions based on the first distance.

27. The apparatus of claim 26, wherein the processor is configured to correlate input samples with a synchronization sequence to detect for the first and second synchronization transmissions, and to determine the first and second locations based on correlation results.

28. The apparatus of claim 26, wherein the processor is configured to perform correlation for the first and second synchronization transmissions based on a single matched filter.

29. The apparatus of claim 26, wherein the processor is configured to determine frame boundary based on the first distance.

30. The apparatus of claim 26, wherein the processor is configured to determine a group of cell identifiers for a cell sending the first and second synchronization transmissions based on the first distance.

31. The apparatus of claim 26, wherein the processor is configured to receive a third synchronization transmission in a third location of the frame, the third location being a predetermined offset from the first location.

32. The apparatus of claim 31, wherein the processor is configured to derive a channel estimate based on the first synchronization transmission and to perform coherent detection of the third synchronization transmission based on the channel estimate.

33. An apparatus comprising:
a processor configured to receive a first synchronization transmission in a first location of a frame, to receive a second synchronization transmission in a second location of the frame, to perform detection for the first and second synchronization transmissions, and to determine a first distance between the first and second locations of the frame, the first distance being different from a second distance between the second location of the frame and the first location of a next frame; and
a memory coupled to the processor, wherein the processor is configured to receive a third synchronization transmission in a third location of the frame, the third location being a predetermined offset from the first location, and wherein the processor is configured to determine a group of cell identifiers based on the first distance and to perform correlation for the third synchronization transmission based on the group cell identifiers to obtain a cell identifier for a cell sending the first, second and third synchronization transmissions.

34. A method comprising:
receiving a first synchronization transmission in a first location of a frame;
receiving a second synchronization transmission in a second location of the frame;
performing detection for the first and second synchronization transmissions;
determining a first distance between the first and second locations of the frame, the first distance being different from a second distance between the second location of the frame and the first location of a next frame; and
determining a cyclic prefix length used by a cell sending the first and second synchronization transmissions based on the first distance.

35. The method of claim 34, further comprising:
determining frame boundary based on the first distance.

36. The method of claim 34, further comprising:
determining a group of cell identifiers for a cell sending the first and second synchronization transmissions based on the first distance.

37. The method of claim 34, further comprising:
receiving a third synchronization transmission in a third location of the frame, the third location being a predetermined offset from the first location;
deriving a channel estimate based on the first synchronization transmission; and
performing coherent detection of the third synchronization transmission based on the channel estimate.

38. An apparatus comprising:
means for receiving a first synchronization transmission in a first location of a frame;
means for receiving a second synchronization transmission in a second location of the frame;
means for performing detection for the first and second synchronization transmissions;
means for determining a first distance between the first and second locations of the frame, the first distance being different from a second distance between the second location of the frame and the first location of a next frame; and
means for determining a cyclic prefix length used by a cell sending the first and second synchronization transmissions based on the first distance.

39. The apparatus of claim 38, further comprising:
means for determining frame boundary based on the first distance.

40. The apparatus of claim 38, further comprising:
means for receiving a third synchronization transmission in a third location of the frame, the third location being a predetermined offset from the first location;
means for deriving a channel estimate based on the first synchronization transmission; and means for performing coherent detection of the third synchronization transmission based on the channel estimate.

41. A computer program product including a non-transitory computer-readable medium including instructions, the set of instructions, comprising:
a first instruction set for receiving a first synchronization transmission in a first location of a frame;
a second instruction set for receiving a second synchronization transmission in a second location of the frame;
a third instruction set for performing detection for the first and second synchronization transmissions;
a fourth instruction set for determining a first distance between the first and second locations of the frame, the first distance being different from a second distance between the second location of the frame and the first location of a next frame; and
a fifth instruction for determining a cyclic prefix length used by a cell sending the first and second synchronization transmissions based on the first distance.

42. The computer program product computer-readable medium of claim 41, and further comprising:
a sixth instruction set for determining frame boundary based on the first distance.

43. An apparatus comprising:
a processor configured to send a primary synchronization transmission in a first location of a frame, the first location being non-overlapping with at least one other location used for at least one other primary synchronization transmission sent by at least one neighboring cell, and to send a secondary synchronization transmission in a second location of the frame; and
a memory coupled to the processor, wherein the processor is configured to use a cyclic prefix length based on a distance between the first and second locations of the frame.

44. The apparatus of claim 43, wherein the first location and the at least one other location correspond to different symbol periods of the frame.

45. The apparatus of claim 43, wherein the first and second locations correspond to adjacent symbol periods of the frame.

46. An apparatus comprising:
a processor configured to receive a primary synchronization transmission from a first cell in a first location of a frame, the first location being non-overlapping with at least one other location used for at least one other primary synchronization transmission sent by at least one neighboring cell in a synchronized network, and to receive a secondary synchronization transmission from the first cell in a second location of the frame; and
a memory coupled to the processor, wherein the processor is configured to determine a cyclic prefix length used by the cells sending the primary synchronization transmissions based on a distance between the first and second locations of the frame.

47. The apparatus of claim 46, wherein the processor is configured to derive a channel estimate for the first cell based on the primary synchronization received from the first cell, and to perform coherent detection of the secondary synchronization transmission received from the first cell based on the channel estimate.

48. The apparatus of claim 46, wherein the processor is configured to receive a second primary synchronization transmission from a second cell in a third location of the frame, the third location being one of the at least one other location, to receive a second secondary synchronization transmission from the second cell in a fourth location of the frame, to derive a second channel estimate for the second cell based on the second primary synchronization received from the second cell; and to perform coherent detection of the second secondary synchronization transmission received from the second cell based on the second channel estimate.

49. The apparatus of claim 46, wherein the processor is configured to receive primary synchronization transmissions from the first cell and the at least one neighboring cell in a third location of the frame, and to detect for the primary synchronization transmissions received in the third location of the frame.

* * * * *